US009995134B2

(12) United States Patent
Liu et al.

(10) Patent No.: US 9,995,134 B2
(45) Date of Patent: Jun. 12, 2018

(54) ELECTROMAGNETIC PULSE DOWNHOLE TELEMETRY

(71) Applicant: Evolution Engineering Inc., Calgary (CA)

(72) Inventors: Jili Liu, Calgary (CA); Aaron W. Logan, Calgary (CA); Mingdong Xu, Calgary (CA); David A. Switzer, Calgary (CA)

(73) Assignee: Evolution Engineering Inc., Calgary (CA)

( * ) Notice: Subject to any disclaimer, the term of this patent is extended or adjusted under 35 U.S.C. 154(b) by 3 days.

(21) Appl. No.: 14/769,379

(22) PCT Filed: Feb. 21, 2014

(86) PCT No.: PCT/CA2014/050122
§ 371 (c)(1),
(2) Date: Aug. 20, 2015

(87) PCT Pub. No.: WO2014/127482
PCT Pub. Date: Aug. 28, 2014

(65) Prior Publication Data
US 2016/0003034 A1 Jan. 7, 2016

Related U.S. Application Data

(60) Provisional application No. 61/767,574, filed on Feb. 21, 2013.

(51) Int. Cl.
*E21B 47/12* (2012.01)
*H04B 13/02* (2006.01)
(Continued)

(52) U.S. Cl.
CPC ............ *E21B 47/122* (2013.01); *E21B 49/00* (2013.01); *H04B 13/02* (2013.01); *H04L 27/02* (2013.01); *H04L 27/04* (2013.01)

(58) Field of Classification Search
CPC ....... E21B 49/00; E21B 47/122; H04B 13/02; H04L 27/02; H04L 27/04
(Continued)

(56) References Cited

U.S. PATENT DOCUMENTS 4,283,953 A * 8/1981 Plona ..................... G01N 29/11
367/86
4,302,757 A 11/1981 Still
(Continued)

FOREIGN PATENT DOCUMENTS

CA 2634236 A1 10/2007
GB 2 404 401 A 2/2005
(Continued)

*Primary Examiner* — Omar Casillashernandez
(74) *Attorney, Agent, or Firm* — Seed Intellectual Property Law Group LLP

(57) ABSTRACT

An apparatus for transmitting electromagnetic (EM) telemetry data from a downhole location to surface comprising: an EM signal transmitter configured to generate positive and negative polarity EM pulses corresponding to a telemetry signal; and an electronics subassembly communicative with the EM signal transmitter and comprising a processor and a memory having encoded thereon program code executable by the processor to perform a method comprising encoding measurement data into an EM telemetry signal using a modulation scheme comprising mapping a symbol set to at least one positive polarity EM pulse and one negative polarity EM pulse; and sending a control signal to the EM signal transmitter to generate EM pulses corresponding to the EM telemetry signal. The EM signal transmitter can comprise an H-bridge circuit electrically coupled to positive and negative ends of a gap sub such that applying a voltage across a positive pathway of the H-bridge circuit generates the positive polarity EM pulse, and applying a voltage across a negative pathway of the H-bridge circuit generates the negative polarity EM pulse.

12 Claims, 23 Drawing Sheets

(51) Int. Cl.
*H04L 27/02* (2006.01)
*E21B 49/00* (2006.01)
*H04L 27/04* (2006.01)

(58) Field of Classification Search
USPC .................................................. 340/853.2
See application file for complete search history.

(56) References Cited

U.S. PATENT DOCUMENTS

| | | | | |
|---|---|---|---|---|
| 4,665,511 | A * | 5/1987 | Rodney | E21B 47/082 367/27 |
| 4,691,203 | A * | 9/1987 | Rubin | E21B 47/122 324/369 |
| 5,874,676 | A * | 2/1999 | Maki, Jr. | E21B 47/0005 181/105 |
| 6,002,708 | A * | 12/1999 | Fleming | G01S 1/045 327/336 |
| 8,251,160 | B2 | 8/2012 | Gopalan et al. | |
| 2004/0156264 | A1 | 8/2004 | Gardner et al. | |
| 2005/0251342 | A1 * | 11/2005 | Market | G01V 1/48 702/6 |
| 2006/0227005 | A1 * | 10/2006 | Fincher | E21B 47/12 340/855.4 |
| 2013/0142409 | A1 * | 6/2013 | Chinn | A61B 6/5205 382/131 |
| 2013/0163697 | A1 * | 6/2013 | Moser | H04L 27/04 375/300 |
| 2013/0176139 | A1 | 7/2013 | Chau et al. | |
| 2013/0292110 | A1 * | 11/2013 | Fraser | E21B 47/18 166/250.01 |

FOREIGN PATENT DOCUMENTS

| | | |
|---|---|---|
| WO | 2004/005966 A1 | 1/2004 |
| WO | 2013/170372 A1 | 11/2013 |

* cited by examiner ered in the art to include equivalents, alternatives, variations, and modifications having substantially the same function, or providing the same result, as a corresponding feature described herein.

ELECTROMAGNETIC PULSE DOWNHOLE TELEMETRY

FIELD

This invention relates generally to electromagnetic ("EM") downhole telemetry, and particularly to EM telemetry using EM pulses.

BACKGROUND

The recovery of hydrocarbons from subterranean zones relies on the process of drilling wellbores. The process includes drilling equipment situated at surface, and a drill string extending from the surface equipment to a below-surface formation or subterranean zone of interest. The terminal end of the drill string includes a drill bit for drilling (or extending) the wellbore. The process also involves a drilling fluid system, which in most cases uses a drilling "mud" that is pumped through the inside of piping of the drill string to cool and lubricate the drill bit. The mud exits the drill string via the drill bit and returns to surface carrying rock cuttings produced by the drilling operation. The mud also helps control bottom hole pressure and prevent hydrocarbon influx from the formation into the wellbore, which can potentially cause a blow out at surface.

Directional drilling is the process of steering a well from vertical to intersect a target endpoint or follow a prescribed path. At the terminal end of the drill string is a bottom-hole-assembly ("BHA") which comprises 1) the drill bit; 2) a steerable downhole mud motor of a rotary steerable system; 3) sensors of survey equipment used in logging-while-drilling ("LWD") and/or measurement-while-drilling ("MWD") to evaluate downhole conditions as drilling progresses; 4) means for telemetering data to surface; and 5) other control processes such as stabilizers or heavy weight drill collars. The BHA is conveyed into the wellbore by a string of metallic tubulars (i.e. drill pipe). MWD equipment is used to provide downhole sensor and status information to surface while drilling in a near real-time mode. This information is used by a rig crew to make decisions about controlling and steering the well to optimize the drilling speed and trajectory based on numerous factors, including lease boundaries, existing wells, formation properties, and hydrocarbon size and location. The rig crew can make intentional deviations from the planned wellbore path as necessary based on the information gathered from the downhole sensors during the drilling process. The ability to obtain real-time MWD data allows for a relatively more economical and more efficient drilling operation.

Some known MWD tools contain a sensor package to survey the wellbore and send data back to surface using a telemetry method known as electromagnetic (EM) telemetry. EM telemetry involves using an EM telemetry tool to generate EM waves carrying encoded data and transmit these waves from the wellbore through the surrounding formations, and using surface receiving equipment to detect and decode the waves at surface. The BHA metallic tubular is typically used as the dipole antennae for the EM telemetry tool by dividing the drill string into two conductive sections by an insulating joint or connector ("gap sub") typically placed within the BHA, with the bottom portion of the BHA and the drill pipe each forming an antennae for the dipole antennae. In EM telemetry systems, a very low frequency alternating current is driven across the gap sub. The sub is electrically isolated ("nonconductive") at the insulating joint, effectively creating an insulating break ("gap") between the portion of the drill string below the gap and the portion above the gap, which extends all the way up to the surface. The lower part below the gap typically is set as a ground but the polarity of the members can be switched. The low frequency AC voltage and magnetic reception is controlled in a timed/coded sequence to energize the earth and create a measurable voltage differential between the surface ground and the top of the drill string. The EM signal which originated across the gap is detected at surface and measured as a difference in the electric potential from the drill rig to various surface grounding rods located about the drill site.

Typically, a sinusoid waveform is used as a carrier signal for the telemetry data. The MWD tool comprises a downhole modulator which can use one of a number of encoding or modulation schemes to encode the telemetry data onto a carrier waveform. The three key parameters of a periodic waveform are its amplitude ("volume"), its phase ("timing") and its frequency ("pitch"). Any of these properties can be modified in accordance with a low frequency signal to obtain a modulated signal. Frequency-shift keying ("FSK") is a frequency modulation scheme in which digital information is transmitted through discrete frequency changes of a carrier wave. The simplest FSK is binary FSK ("BFSK"). BFSK uses a pair of discrete frequencies to transmit binary information. Amplitude shift keying ("ASK") conveys data by changing the amplitude of the carrier wave; phase-shift keying ("PSK") conveys data by changing, or modulating, the phase of a reference signal (the carrier wave). It is known to combine different modulation techniques to encode telemetry data.

The choice of modulation scheme uses a finite number of distinct signals to represent digital data. PSK uses a finite number of phases, wherein each phase is assigned a unique pattern of binary digits, or "symbols", and wherein the symbols together form a defined symbol set. Usually, each phase encodes an equal number of bits. Each pattern of bits forms the symbol that is represented by the particular phase. A surface demodulator contains the same symbol set used by the downhole modulator, and determines the phase of the received signal and maps it back to the symbol it represents, thus recovering the original data.

EM transmissions can be strongly attenuated over long distances through the earth formations, with higher frequency signals attenuating faster than low frequency signals; thus, EM telemetry tends to require a relatively large amount of power and/or utilize relatively low frequencies so that the signals can be detected at surface. These limitations create challenges with battery life and low data rate transmission in the downhole MWD tool.

SUMMARY

According to one aspect of the invention, there is provided a method for transmitting EM telemetry data from a downhole location to surface, comprising: encoding measurement data into an EM telemetry signal using a modulation scheme comprising mapping a symbol set to at least one positive polarity EM pulse and one negative polarity EM pulse; and generating positive and negative polarity EM pulses corresponding to the EM telemetry signal. The method can further comprise selecting a pulse frequency range in which case the step of generating positive and negative polarity EM pulses comprises generating EM pulses having a pulse width corresponding to the selected pulse frequency range. The measurement data can be of a formation through which the EM pulse will travel, in which case the step of selecting the pulse frequency range comprises determining an attenuation of the formation from the measurement data and selecting a frequency range suitable for the determined attenuation.

The positive and negative polarity EM pulses can be generated by applying a voltage across a positive pathway of an H-bridge circuit electrically coupled to positive and negative ends of a gap sub to generate the positive polarity EM pulse, and applying a voltage across a negative pathway of the H-bridge circuit to generate the negative polarity EM pulse.

The modulation scheme can include timing shift keying ("TSK") comprising mapping each symbol in the symbol set to a pulse state having a selected polarity and a selected timing position. Alternatively, the modulation scheme can include amplitude shift keying ("ASK") comprising mapping each symbol in the symbol set to a pulse state having a selected amplitude and a selected polarity. When using an ASK modulation scheme, the step of generating positive and negative polarity EM pulses comprises applying a voltage across a positive pathway of an H-bridge circuit electrically coupled to positive and negative ends of a gap sub to generate the positive polarity EM pulse, applying a voltage across a negative pathway of the H-bridge circuit to generate the negative polarity EM pulse, and varying the voltage applied to the H-bridge circuit to vary the amplitude for the ASK modulation scheme.

Alternatively, the modulation scheme can include amplitude and timing shift keying ("ATSK") comprising mapping each symbol in the symbol set to a pulse state having a selected amplitude, a selected polarity, and a selected timing position. When using an ATSK modulation scheme, the step of generating positive and negative polarity EM pulses comprises applying a voltage across a positive pathway of an H-bridge circuit electrically coupled to positive and negative ends of a gap sub to generate the positive polarity EM pulse, applying a voltage across a negative pathway of the H-bridge circuit to generate the negative polarity EM pulse, varying the voltage applied to the H-bridge circuit to vary the amplitude for the ATSK modulation scheme, and varying the timing of applying the voltage to the H-bridge circuit to vary the timing position for the ATSK modulation scheme.

According to another aspect of the invention, there is provided an apparatus for transmitting EM telemetry data from a downhole location to surface, comprising: an EM signal transmitter configured to generate positive and negative polarity EM pulses corresponding to a telemetry signal; and an electronics subassembly communicative with the EM signal transmitter and comprising a processor and a memory having encoded thereon program code executable by the processor to perform a method comprising encoding measurement data into an EM telemetry signal using a modulation scheme comprising mapping a symbol set to at least one positive polarity EM pulse and one negative polarity EM pulse; and sending a control signal to the EM signal transmitter to generate EM pulses corresponding to the EM telemetry signal.

The apparatus can further comprise a gap sub. The EM signal transmitter can further comprise an H-bridge circuit electrically coupled to positive and negative ends of the gap sub such that applying a voltage across a positive pathway of the H-bridge circuit generates the positive polarity EM pulse, and applying a voltage across a negative pathway of the H-bridge circuit generates the negative polarity EM pulse.

The EM signal transmitter can further comprise a voltage regulator electrically coupled to the H-bridge circuit, a power source coupled to the voltage regulator, and a signal transmitter communicative with the voltage regulator, the H-bridge circuit, and the electronics subassembly. The signal transmitter is configured to receive the control signal from the processor and to send a polarity control signal to the H-bridge circuit and a voltage output and timing control signal to the voltage regulator. The voltage regulator can be a variable output voltage regulator capable of outputting voltage levels corresponding to the selected amplitudes in the ASK modulation scheme.

According to another aspect of the invention, there is provided a method for transmitting electromagnetic (EM) telemetry data from a downhole location to surface, comprising: encoding measurement data into an EM telemetry signal using a modulation scheme comprising mapping a symbol set to EM pulses of different amplitudes; and generating EM pulses corresponding to the EM telemetry signal. The modulation scheme can include ASK comprising mapping each symbol in the symbol set to a pulse state having a selected amplitude.

The step of encoding measurement data into an EM telemetry signal can comprise mapping a symbol set to positive or negative polarity EM pulses, in which case the step of generating EM pulses comprises generating positive polarity or negative polarity pulses corresponding to the EM telemetry signal. More particularly, the step of generating positive polarity EM pulses can comprise applying a voltage across a positive pathway of an H-bridge circuit electrically coupled to positive and negative ends of a gap sub to generate the positive polarity EM pulse, and the step of generating negative polarity pulses can comprise applying a voltage across a negative pathway of the H-bridge circuit to generate the negative polarity EM pulse. The different amplitudes of the EM pulses are obtained by varying the voltage applied to the H-bridge circuit.

The modulation scheme can include ATSK comprising mapping each symbol in the symbol set to a pulse state having a selected amplitude, a selected polarity, and a selected timing position. When using ATSK modulation, the step of generating positive polarity EM pulses can comprise applying a voltage across a positive pathway of an H-bridge circuit electrically coupled to positive and negative ends of a gap sub to generate the positive polarity EM pulse, and the step of generating negative polarity EM pulses can comprise applying a voltage across a negative pathway of the H-bridge circuit to generate the negative polarity EM pulse, and the different amplitudes of EM pulses can be obtained by varying the voltage applied to the H-bridge circuit to vary the amplitude for the ATSK modulation scheme, and the different timing positions can be obtained by varying the timing of applying the voltage to the H-bridge circuit.

According to another aspect of the invention, there is provided an apparatus for transmitting EM telemetry data from a downhole location to surface, comprising: an EM signal transmitter configured to generate EM pulses of different amplitudes corresponding to a telemetry signal; and an electronics subassembly communicative with the EM signal transmitter and comprising a processor and a memory having encoded thereon program code executable by the processor to perform a method comprising encoding measurement data into an EM telemetry signal using a modulation scheme comprising mapping a symbol set to EM pulses of different amplitudes, and sending a control signal to the EM signal transmitter to generate EM pulses corresponding to the EM telemetry signal. The apparatus can further comprise a gap sub, and the EM signal transmitter can further comprise an H-bridge circuit electrically coupled to positive and negative ends of the gap sub such that applying a voltage across a positive pathway of the H-bridge circuit generates a positive polarity EM pulse, and applying a voltage across a negative pathway of the H-bridge circuit generates a negative polarity EM pulse. The EM signal transmitter can further comprise a variable output voltage regulator electrically coupled to the H-bridge circuit, a power source coupled to the voltage regulator, and a signal transmitter communicative with the voltage regulator, the H-bridge circuit, and the electronics subassembly. The signal transmitter is configured to receive the control signal from the processor and to send a polarity control signal to the H-bridge circuit and a voltage output and timing control signal to the voltage regulator.

The modulation scheme can include TSK comprising mapping each symbol in the symbol set to a pulse state having a selected polarity and a selected timing position. Alternatively, the modulation scheme can include ASK comprising mapping each symbol in the symbol set to a pulse state having a selected amplitude and a selected polarity. Alternatively, the modulation scheme can include ATSK comprising mapping each symbol in the symbol set to a pulse state having a selected amplitude, a selected polarity, and a selected timing position.

According to another aspect of the invention there is provided an EM telemetry method comprising encoding downhole data into a single data stream; separating the single data stream into a plurality of separate data streams; converting one data stream into an EM pulse signal using a selected digital modulation technique and another data stream into an EM carrier wave signal using another selected digital modulation technique, wherein the frequency range of the EM pulses and the EM carrier waves are assigned a unique non-overlapping range of values; combining the EM pulse and carrier wave signals into a combined waveform; and transmitting from a downhole location, an EM telemetry transmission comprising the combined waveform.

According to yet another aspect of the invention there is provided an EM telemetry system comprising a downhole telemetry tool comprising: a gap sub assembly; an EM signal transmitter for generating an EM telemetry transmission across an electrically isolated gap of the gap sub assembly; an electronics subassembly communicative with the signal transmitter and comprising a downhole processor and a memory containing an encoder program code executable by the downhole processor to perform a method comprising: encoding downhole data into a single data stream; separating the single data stream into a plurality of separate data streams; converting one data stream into an EM pulse signal using a selected digital modulation technique and another data stream into an EM carrier wave signal using another selected digital modulation technique, wherein the frequency range the EM pulses and the EM carrier waves are assigned a unique non-overlapping range of values; combining the EM pulse and carrier wave signals into a combined waveform; and sending a control signal to the signal transmitter to transmit an EM telemetry transmission comprising the combined waveform.

DETAILED DESCRIPTION

Embodiments of the present invention described herein relate to an apparatus and a method for transmitting electromagnetic (EM) telemetry data from a downhole location to surface, comprising: encoding measurement data into an EM telemetry signal using a modulation scheme comprising mapping a symbol set to at least one positive polarity EM pulse and one negative polarity EM pulse; and generating positive and negative polarity EM pulses corresponding to the EM telemetry signal. Alternatively, the method comprises encoding measurement data into an EM telemetry signal using an amplitude modulation scheme comprising mapping a symbol set to EM pulses of different amplitudes, wherein the EM pulses can be positive or negative. In yet another alternative, the method comprises converting one data stream into an EM pulse signal using a selected digital modulation technique and another data stream into an EM carrier wave signal using another selected digital modulation technique, wherein the frequency range of the EM pulses and the EM carrier waves are assigned a unique non-overlapping range of values; combining the EM pulse and carrier wave signals into a combined waveform; and transmitting the combined waveform.

Figure 1:
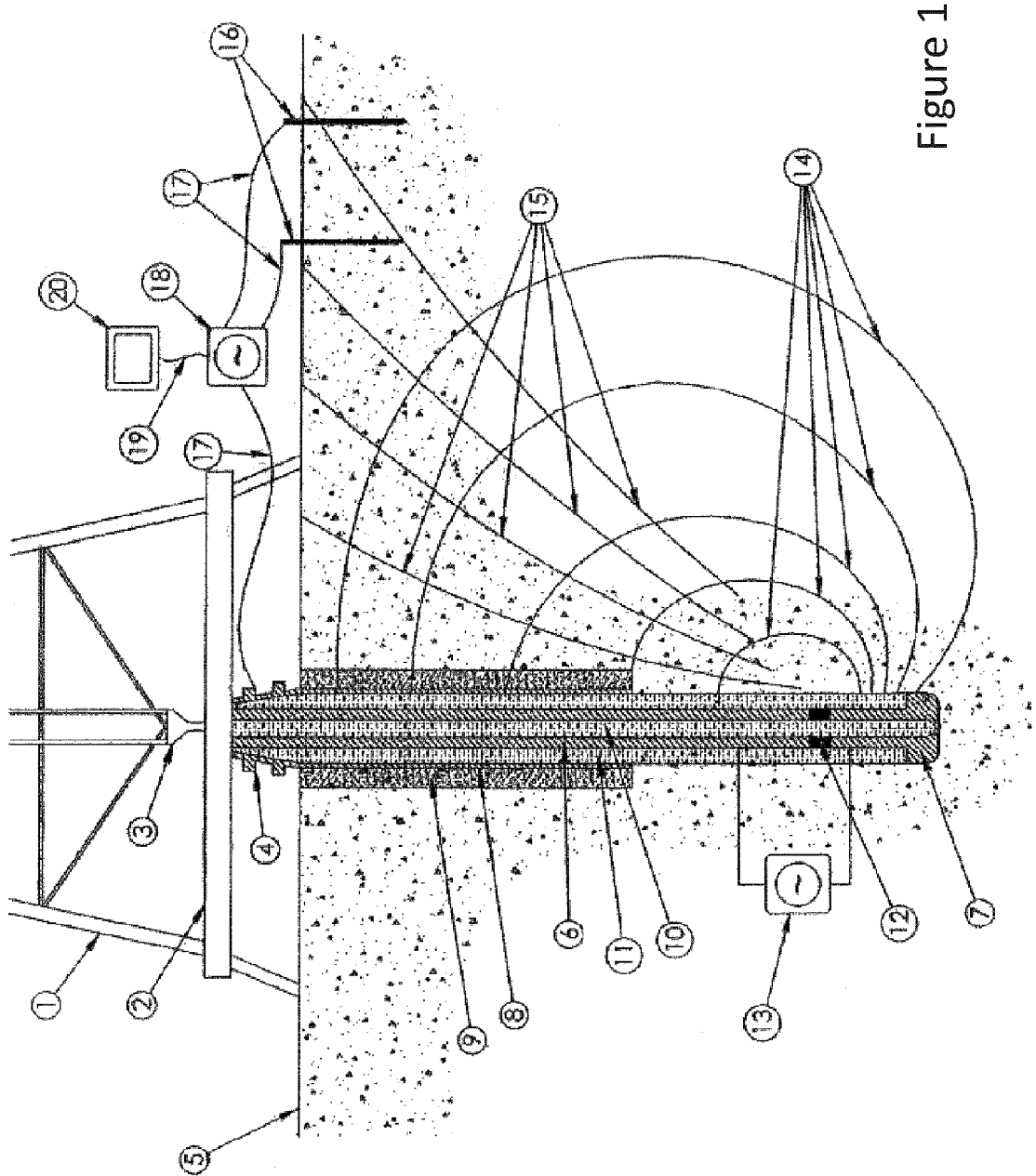
FIG. 1 is a schematic side view of a bipolar pulse EM telemetry system in operation, according to embodiments of the invention.

Referring to FIG. 1, there is shown a schematic representation of an EM telemetry system in which embodiments of the present invention can be employed. Downhole drilling equipment including a derrick 1 with a rig floor 2 and draw works 3 facilitates rotation of drill pipe 6 into the ground 5. The drill pipe 6 is enclosed in casing 8 which is fixed in position by casing cement 9. Bore drilling fluid 10 is pumped down the drill pipe 6 and through an electrically isolating gap sub assembly 12 to drill bit 7. Annular drilling fluid 11 is then pumped back to the surface and passes through a blow out preventer ("BOP") 4 positioned above the ground surface. The gap sub assembly 12 may be positioned at the top of the BHA, with the BHA and the drill pipe 6 each forming antennae for the dipole antennae. The gap sub assembly 12 is electrically isolated ("nonconductive") at its center joint effectively creating an insulating break, known as a gap, between the bottom of the drill string with the BHA and the larger top portion of the drill string that includes the rest of the drill pipe 6 up to the surface. A very low frequency alternating electrical current 14 is generated by an EM signal transmitter 13 and driven across the gap sub assembly 12 to generate discrete pulses which carry encoded telemetry data ("EM telemetry transmission"). The low frequency AC voltage and magnetic reception is controlled in a timed/coded sequence to energize the earth and create an electrical field 15. Communication cables 17 transmit the measurable voltage differential from the top of the drill string and various surface grounding rods 16 located about the drill site to surface receiving and processing equipment 18 which receives and processes the EM telemetry transmission. The grounding rods 16 are generally randomly located on site with some attention to site operations and safety. The EM telemetry transmission is decoded and a receiver box communication cable 19 transmits the data received to a computer display 20 after decoding, thereby providing measurement while drilling information to the rig operator.

Figure 2:
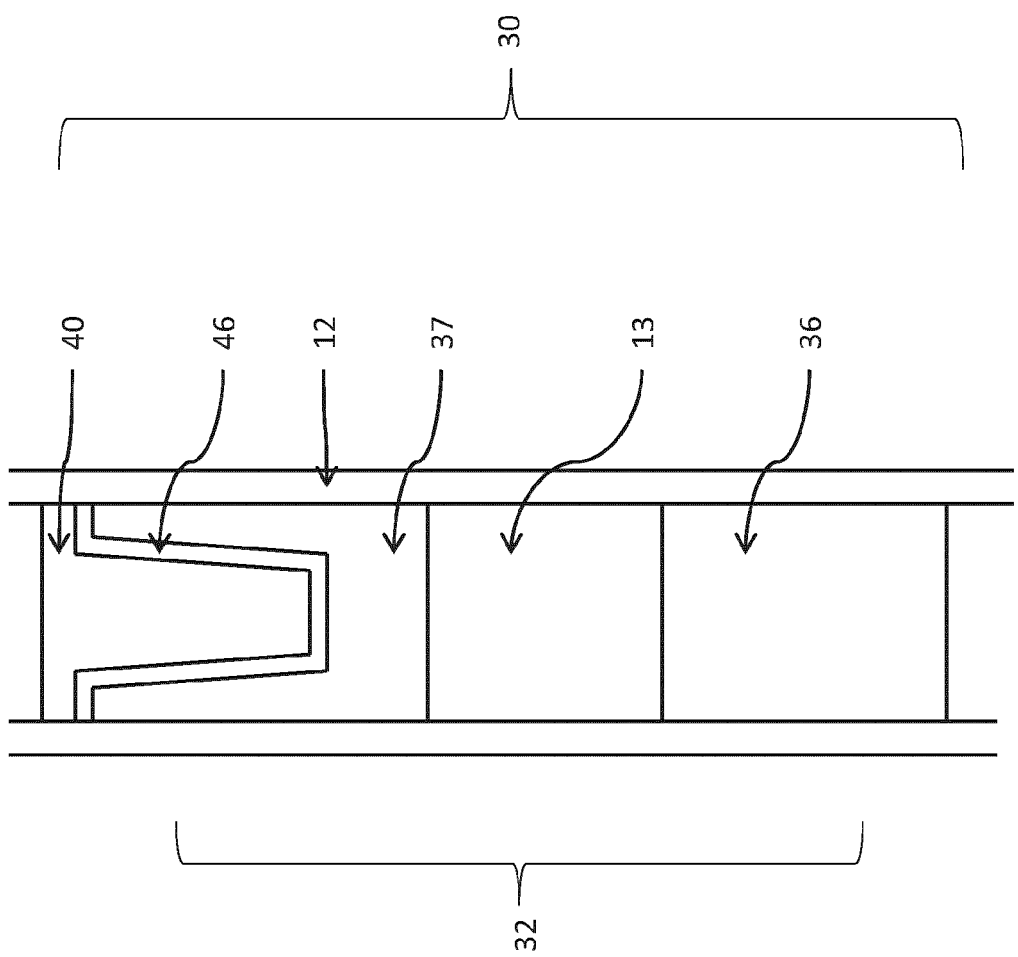
FIG. 2 is a schematic block diagram of components of a downhole EM telemetry tool of the EM telemetry system according to one embodiment.

Referring now to FIG. 2, an EM telemetry system 30 according to one embodiment of the invention comprises a downhole EM telemetry tool 32 and the surface receiving and processing equipment 18. The EM telemetry tool 32 generally comprises the gap sub assembly 12, the EM signal transmitter 13, and an electronics subassembly 36. The electronics subassembly 36 houses sensors for taking downhole measurements as well as a processor and memory which contains program code executable by the processor to encode the sensor measurements into telemetry data and send control signals to the EM signal transmitter 13 to transmit EM pulses to surface. The surface receiving and processing equipment 18 can comprise equipment to receive the pulses, filter and process the pulses, and decode the pulses into the telemetry data.

The gap sub assembly 12 comprises an electrically conductive female member 37 comprising a female mating section and an electrically conductive male member 40 comprising a male mating section. The male mating section is matingly received within a female mating section of the female member 37 and electrically isolated therefrom by an electrical isolator 46. The electrical isolator 46 comprises electrical insulating material that is positioned in between the male and female mating sections. The electrical isolator 46 thereby electrically isolates the male member 40 from the female member 37 and the male member 40, female member 37 and electrical isolator 46 together function as the gap sub assembly 12 for EM telemetry.

Figure 3:
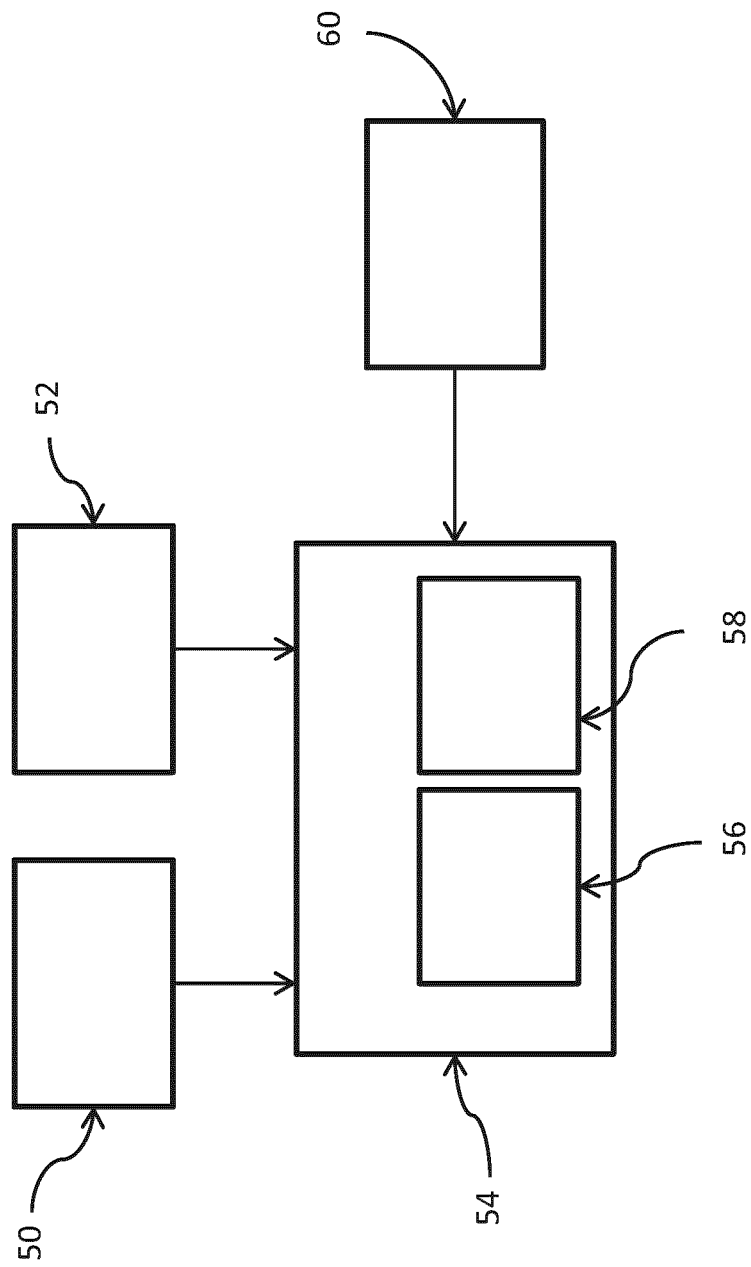
FIG. 3 is a schematic block diagram of components of an electronics subassembly of the downhole EM telemetry tool.

Referring to FIG. 3, the electronics subassembly 36 includes sensors for taking various downhole measurements, and encoding and processing equipment for encoding the measurements and other information (collectively "telemetry data") into a telemetry signal for transmission by the EM signal transmitter 13. More particularly, the electronics subassembly 36 comprises a tubular housing (not shown) and the following components housed inside the housing: a directional and inclination (D&I) sensor module 50; drilling conditions sensor module 52; a main circuit board 54 containing a master processing unit (MPU or otherwise referred to as the "downhole processor") 56 and an integrated (shown) or separate (not shown) data encoder, a memory 58 having stored thereon program code executable by the downhole processor 56, one or more power amplifiers (not shown); and a battery stack 60. The downhole processor 56 can be any suitable processor known in the art for EM tools, and can be for example, a dsPIC33 series MPU. The power amplifiers can be, for example, a power MOSFET H-bridge design configured to transmit data.

The D&I sensor module 50 comprises three axis accelerometers, three axis magnetometers and associated data acquisition and processing circuitry. Such D&I sensor modules are well known in the art and thus are not described in detail here.

The electronics subassembly 36 includes sensors and circuitry for taking various measurements of borehole parameters and conditions including gamma, temperature, pressure, shock, vibration, RPM, and directional parameters. Such sensors and circuitry are also well known in the art and thus are not described in detail here.

The main circuit board 54 can be a printed circuit board with electronic components soldered on the surface of the board 54. The main circuit board 54 and the sensor modules 50, 52 are secured on a carrier device (not shown) which is fixed inside the electronics subassembly housing by end cap structures (not shown). The sensor modules 50, 52 are each electrically communicative with the main circuit board 54 and send measurement data to the downhole processor 56. As will be described below, the memory 58 of the electronics subassembly contains encoder program code that is executed by the downhole processor 56 to perform a method of encoding measurement data into an EM telemetry signal that can be transmitted by the EM signal transmitter 13 using EM pulses to represent bits of data. Different bits of data can be represented as EM pulses of different amplitudes and/or timing. The encoder program code utilizes a modulation technique that uses principles of known digital modulation techniques. In this embodiment, the encoder program code utilizes a modulation technique known as amplitude shift keying ("ASK"), timing shift keying ("TSK") or amplitude timing shift keying ("ATSK") that is a combination of amplitude shift keying and timing shift keying to encode the telemetry data into a telemetry signal comprising EM pulses. ASK involves assigning each symbol of a defined symbol set to a unique pulse amplitude. TSK involves assigning each symbol of a defined symbol set to a unique timing position in a time period. The amplitude and time position values are determined at the peak of each pulse.

Figure 7:
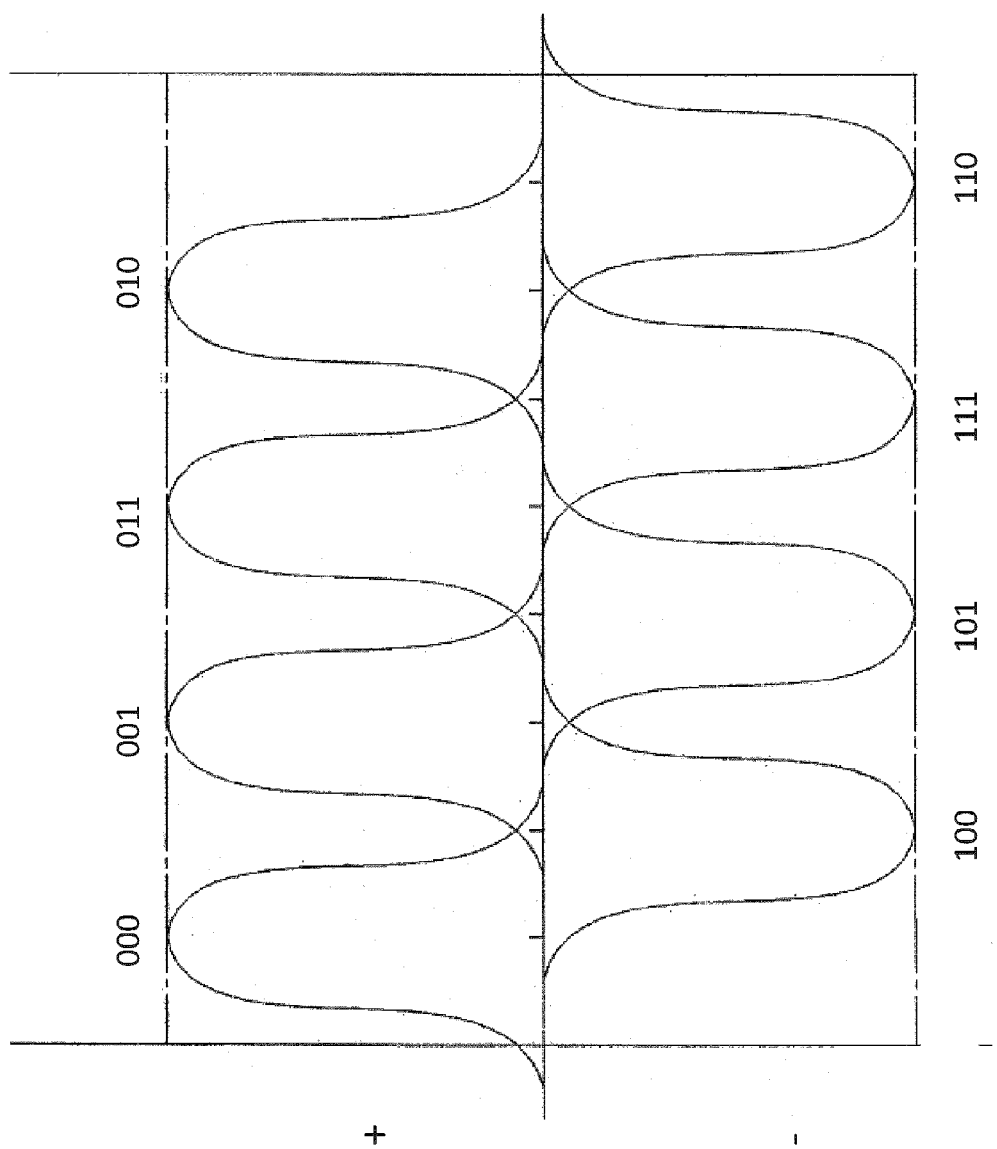
FIG. 7 is a schematic plot (amplitude vs. time) of a bipolar 8TSK pulse encoding scheme in accordance with one embodiment.
Figure 9:
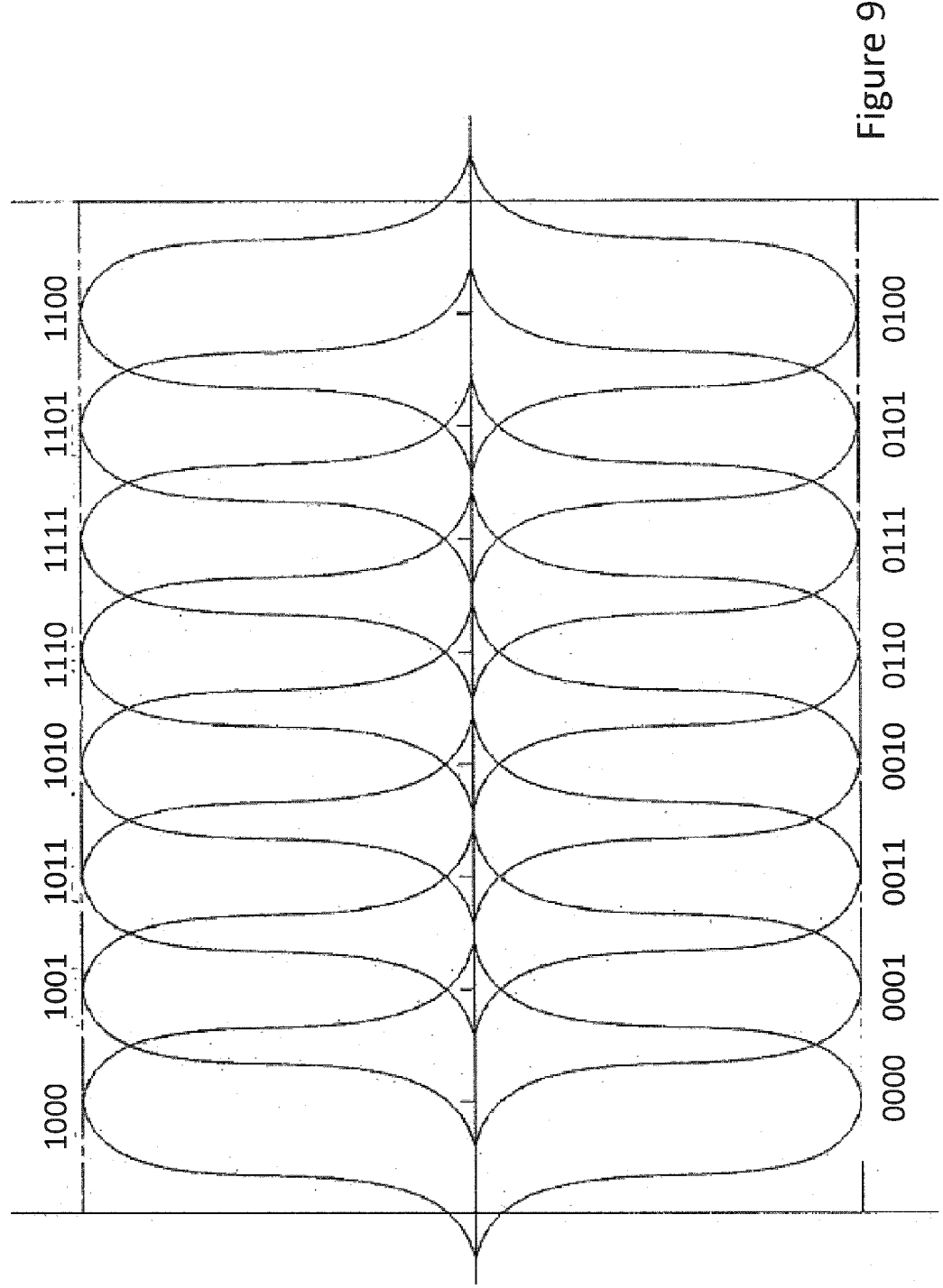
FIG. 9 is a schematic plot (amplitude vs. time) of a bipolar 16TSK pulse encoding scheme in accordance with another embodiment.
Figure 11:
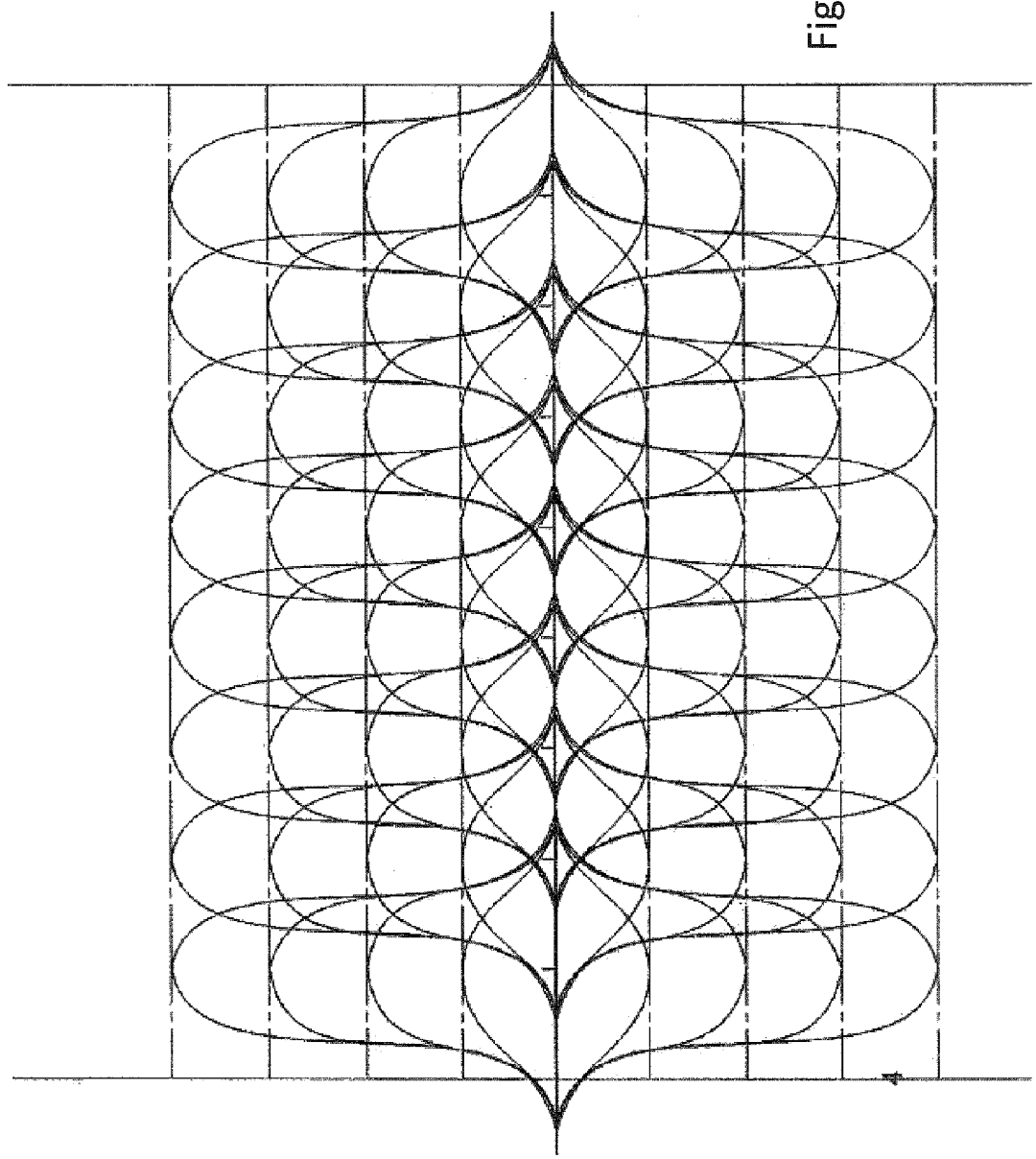
FIG. 11 is a schematic plot (amplitude vs. time) of a bipolar 64ATSK pulse encoding scheme in accordance with another embodiment.

More particularly, the encoder program code can utilize any one of a 3 bit, 8 state version of TSK known as 8TSK as shown in FIG. 7, a 4 bit, 16 state version of TSK known as 16TSK as shown in FIG. 9, or a 6 bit, 64 state version of ATSK known as 64ATSK as shown in FIG. 11 to encode the telemetry data into the EM pulse telemetry signal. Alternatively, other modulation techniques not shown in the Figures can be used, such as 32TSK, 8ATSK, 16ATSK, and 32ATSK. It is expected that modulation techniques with even larger symbol sets up to 1024 states can be used when utilizing bipolar pulses having variable amplitudes and timing positions.

Alternatively, another modulation technique can be used that includes amplitude shift keying only. The signal transmitter 13 as described herein can for example be used with an ASK modulation technique having a pulse with four states, namely a first state corresponding to a low positive amplitude pulse, a second state corresponding to a high positive amplitude pulse, a third state corresponding to a low negative amplitude pulse, and a fourth state corresponding to a high negative amplitude pulse; this enables modulation using a symbol set consisting of four symbols. An EM signal transmitter that is capable of additional pulse amplitudes can be used with ASK modulation having a higher number of states, and a corresponding larger symbol set.

Figure 4:
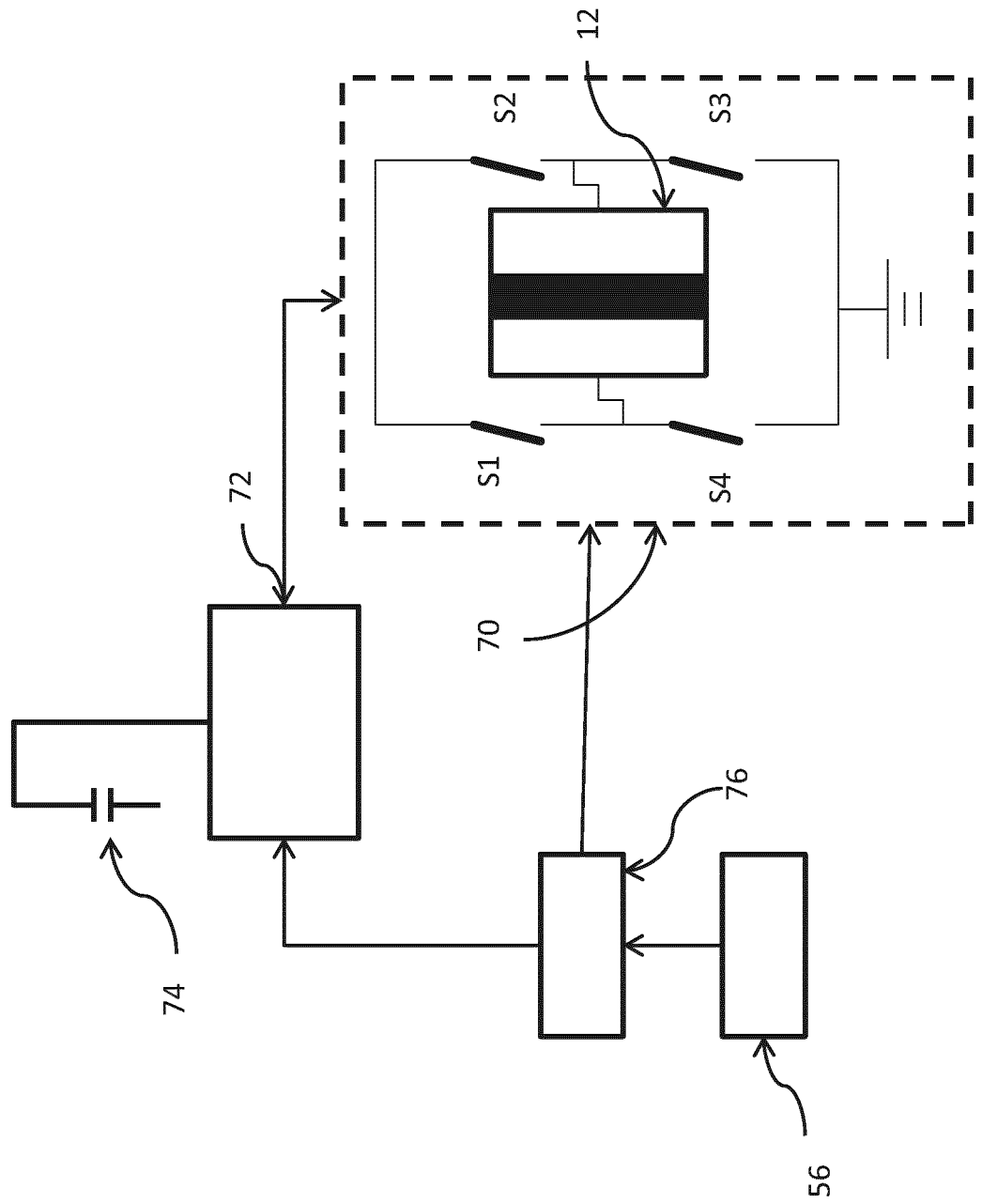
FIG. 4 is a schematic of an EM signal transmitter of the EM telemetry tool.

Referring now to FIG. 4, the EM signal transmitter 13 is configured to generate bipolar EM pulses to carry the telemetry signal encoded by the modulation techniques discussed above. Bipolar EM pulses mean pulses that have either positive or negative amplitude. The EM signal transmitter 13 comprises an H-bridge circuit 70 which is used to switch the polarity of the EM pulse, a voltage regulator 72, a battery 74, and a signal generator 76. As is well known in the art, an H-bridge circuit enables a voltage to be applied across a load in either direction, and comprises four switches of which one pair of switches can be closed to allow a voltage to be applied in one direction ("positive pathway"), and of which another pair of switches can be closed to allow a voltage to be applied in a reverse direction ("negative pathway"). In the H-bridge circuit 70 of the signal transmitter 13, switches S1, S2, S3, S4 are arranged so that the part of the circuit with switches S1 and S4 is electrically coupled to one side of the gap sub 12 ("positive side"), and the part of the circuit with switches S2 and S3 is electrically coupled to the other side of the gap sub 12 ("negative side"). Switches S1 and S3 can be closed to allow a voltage to be applied across the positive pathway of the gap sub 12 to generate a positive polarity pulse, and switches S2 and S4 can be closed to allow a voltage to be applied across the negative pathway of the gap sub 12 to generate a negative polarity pulse.

One end of the H-bridge circuit 70 is grounded and the other end is electrically coupled to the voltage regulator 72. The voltage regulator 72 in turn is electrically coupled to the battery 74 as well as to the signal generator 76. The voltage regulator 72 serves to automatically output a constant voltage level ("rated output") in a manner that is well known in the art. The voltage regulator 72 can output a single fixed voltage at its rated output when the modulation technique does not need to vary the amplitude of the pulse signal (e.g. TSK). Alternatively, a variable output voltage regulator having multiple discrete rated outputs or a continuously variable output can be provided to output voltages of different amplitudes when the modulation technique relies entirely or in part on amplitude modulation (e.g. ASK or ATSK), or to enable the telemetry tool 32 to adjust the strength of the EM transmission to surface.

The signal generator 76 is communicative with the downhole processor 56 and the H-bridge circuit 70, and serves to receive the encoded telemetry signal from the downhole processor 56, and determine the appropriate control signals to send to the voltage regulator 72 and the H-bridge circuit 70. In particular, the signal generator 76 will send voltage output and timing control signals to the voltage regulator 72 to output a voltage at a certain voltage level and timing (or at the fixed voltage level if there is no amplitude shift keying), and send polarity control signals to the H-bridge circuit 70 to close the appropriate switches to create a positive polarity EM pulse or a negative polarity EM pulse. When the modulation technique involves timing shift keying, the signal generator 76 is configured to send the control signals at a specific timing position pattern in accordance with the timing shift keying modulation scheme.

The signal generator 76 is capable of generating a pulse of different widths (frequencies). For example, the signal generator can generate a wide pulse using a very low frequency, e.g. below 2 Hz, and in particular, between 0.5 and 0.25 Hz.

Transmitting at such low frequencies can be useful to take advantage of a natural bias towards lower frequencies when communicating electromagnetically through the earth.

Figure 5:
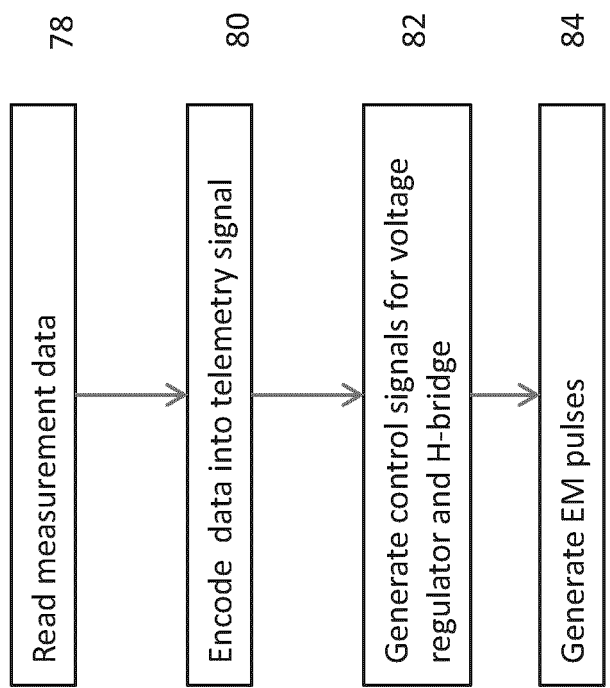
FIG. 5 is a flow chart of steps performed by the downhole EM telemetry tool in a method for transmitting a pulse EM telemetry signal.

The operation of the downhole processor 56 and EM signal transmitter 13 to generate EM pulses containing telemetry data is shown schematically in FIG. 5. The downhole processor 56 executes the program code stored on the memory 58 which instructs the downhole processor 56 to read raw measurement data from the sensor modules 50, 52 and encodes this raw data into a digital bitstream (step 78). The downhole processor 56 is then instructed to apply a selected modulation technique to encode the bitstream into a telemetry signal comprising a series of pulses (step 80). The signal generator 76 receives this telemetry signal and generates control signals for the voltage regulator 72 and H-bridge circuit 70 (step 82) to generate an EM pulse having the appropriate voltage level, timing, and polarity as dictated by the modulation technique (step 84).

The processor 56 can also be programmed to receive from a downlink transmission an expected attenuation of an EM transmission from the telemetry tool 32 to surface through the formation. The downhole processor 56 can then select an appropriate frequency for transmitting the EM pulses, and send instructions to the signal transmitter 13 to generate EM pulses at the selected frequency. The downhole processor 56 can also determine the effective impedance and select an appropriate voltage output that ensures that the pulses are detectable at surface (using a voltage regulator with variable output) while the energy usage is minimized.

Figure 8:
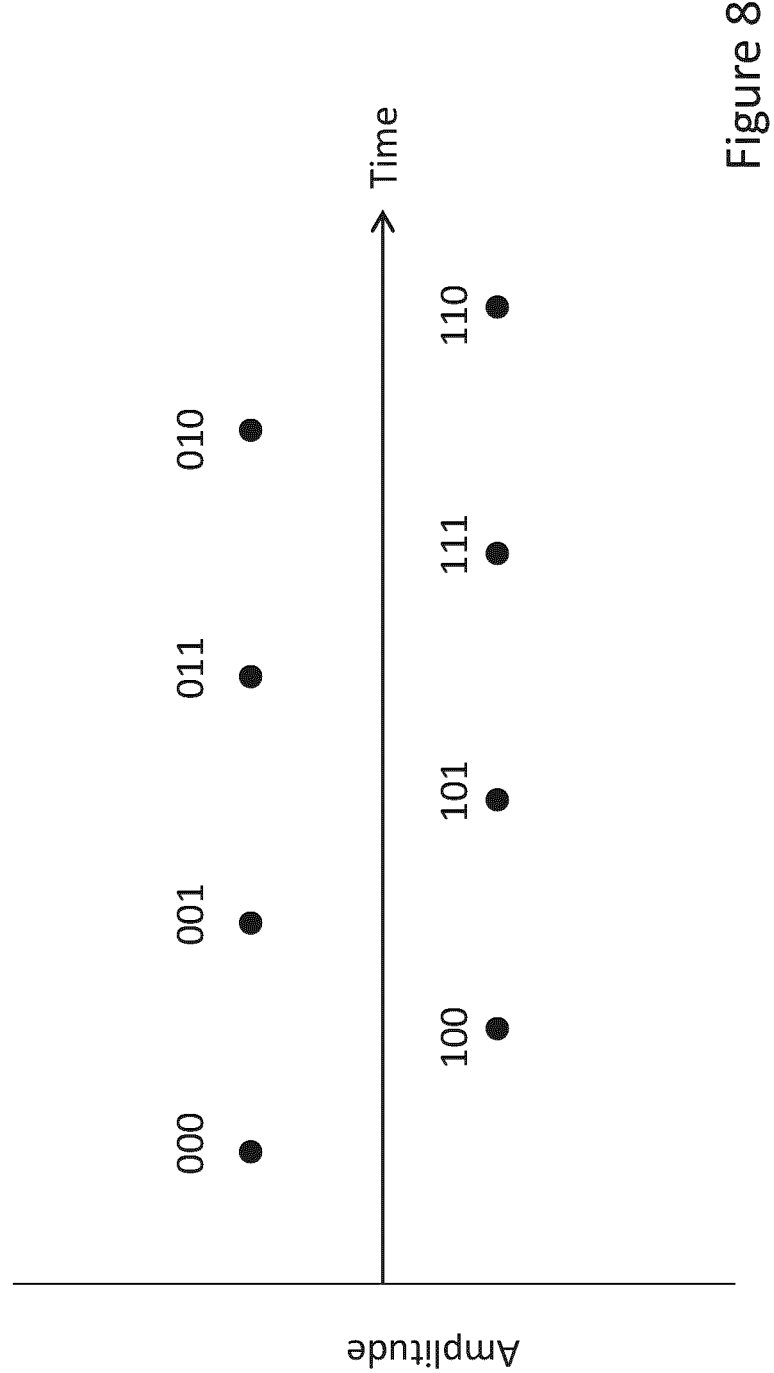
FIG. 8 is a schematic plot of a symbol set to available pulse states for the 8TSK pulse encoding scheme as shown in FIG. 7.

Referring to FIGS. 7 and 8 and according to a first embodiment, the selected modulation technique is 8TSK in which case the memory 58 contains encoder program code executable by the downhole processor 56 to encode measurement data into a 3 bit, 8 state telemetry signal. The 8TSK modulation technique of this embodiment uses an 8 state symbol set wherein each symbol (bit) 000 to 111 corresponds to an EM pulse having a unique one of eight distinct timing positions in a defined cycle and one of two polarities (negative or positive). Unlike conventional modulation techniques, the encoder program code will utilize the 8TSK modulation technique to assign four states (symbols) to four positive amplitude EM pulses of different timing positions and four negative amplitude EM pulses of different timing positions. Assuming one cycle has eight timing positions, and the position and amplitude of each pulse is determined at the peak of each pulse, symbols 000, 001, 011, and 010 are assigned positive amplitude timing pulses at timing positions of 1/8, 3/8, 5/8 and 7/8, and symbols 100, 101, 111, and 110 are assigned negative amplitude EM pulses at timing positions of 2/8, 4/8, 6/8 and 8/8. Thus, it can be seen that a telemetry signal can be transmitted by the signal transmitter 13 to surface comprising a 3 bit symbol per cycle (i.e. a symbol having one of the 8 possible states shown in FIG. 8).

It can also be seen from FIG. 8 that using a bipolar pulse pattern of positive and negative pulses produces significantly better separation between each pulse compared to a conventional all-positive pulse pattern having the same symbol set. Such separation can be useful when conditions create a particularly noisy environment, thereby making it more difficult to the surface receiving and processing equipment 18 to distinguish one EM pulse from another.

Conversely, such improved separation also allows the selected time period to be shortened thereby increasing the data rate, while still providing comparable if not better signal clarity compared to conventional TSK modulation using only positive EM pulses. In other words, for an 8 state symbol set, the bipolar EM signal transmitter 13 can provide a similar separation between pulses in half the time period compared to a positive only signal transmitter.

As noted above, and in accordance with an alternative embodiment, the EM telemetry tool 32 is configured to transmit EM pulses of only positive polarities or only negative polarities, in which case different EM states are provided by varying the amplitude and/or timing of the EM pulses, and ASK or ATSK is used to encode measurement data into the telemetry signal, by mapping each symbol in the symbol set to an EM pulse with a unique amplitude and/or timing position.

Figure 10:
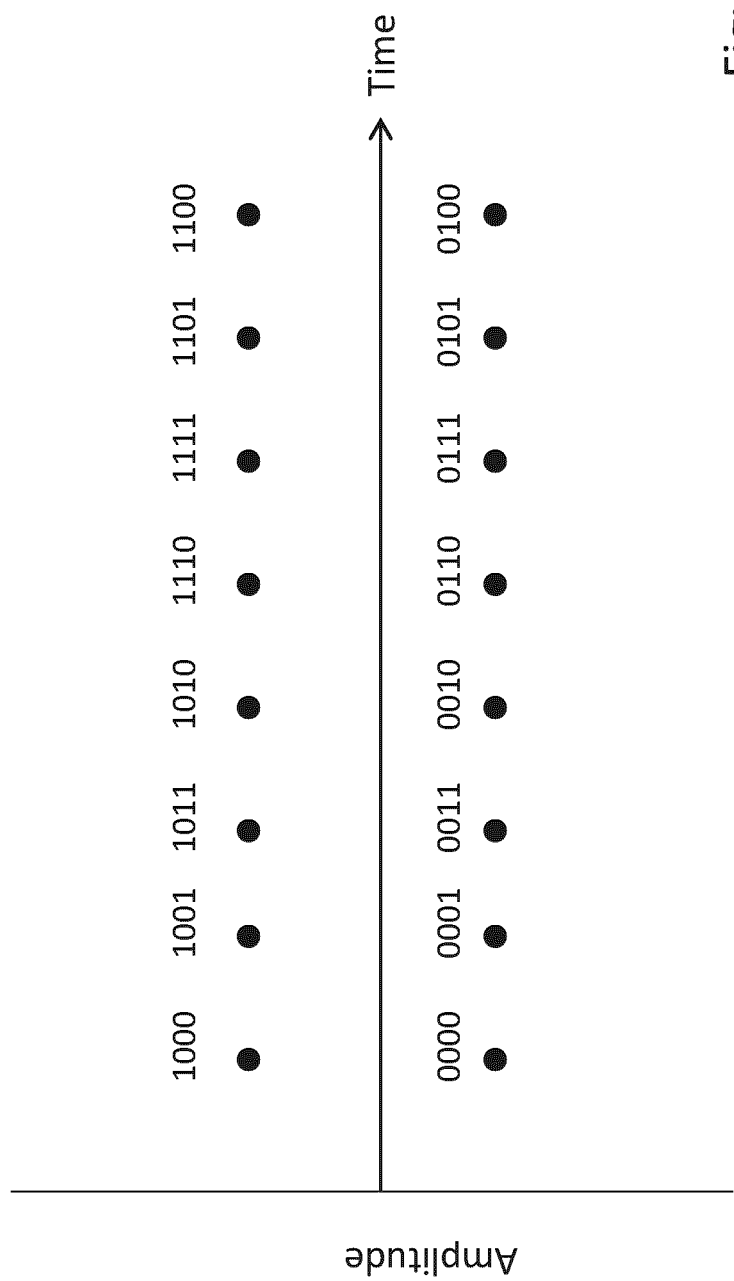
FIG. 10 is a schematic plot of a symbol set to available pulse states for the 16TSK pulse encoding scheme as shown in FIG. 9.

Referring now to FIGS. 9 and 10 and according to a second embodiment, the memory 58 contains encoder program code executable by the downhole processor 56 to encode measurement data into a 4 bit, 16 state telemetry signal using a 16TSK modulation technique. This modulation technique provides an improved data rate over the 8TSK modulation technique of the first embodiment shown in FIG. 7. In this second embodiment, the 16TSK modulation technique uses a 16 symbol set wherein each symbol 0000 to 1111 corresponds to an EM pulse having a unique combination of a positive or negative pulse and one of eight available timing positions. That is, symbols 1000, 1001, 1011, 1010, 1110, 1111, 1101, and 1100 are assigned positive EM pulses at timing positions 1/8, 2/8, 3/8, 4/8, 5/8, 6/8, 7/8 and 8/8 respectively, and symbols 0000, 0001, 0011, 0010, 0110, 0111, 0101, and 0100 are assigned negative EM pulses at the same timing positions 1/8 to 8/8 respectively.

Figure 12:
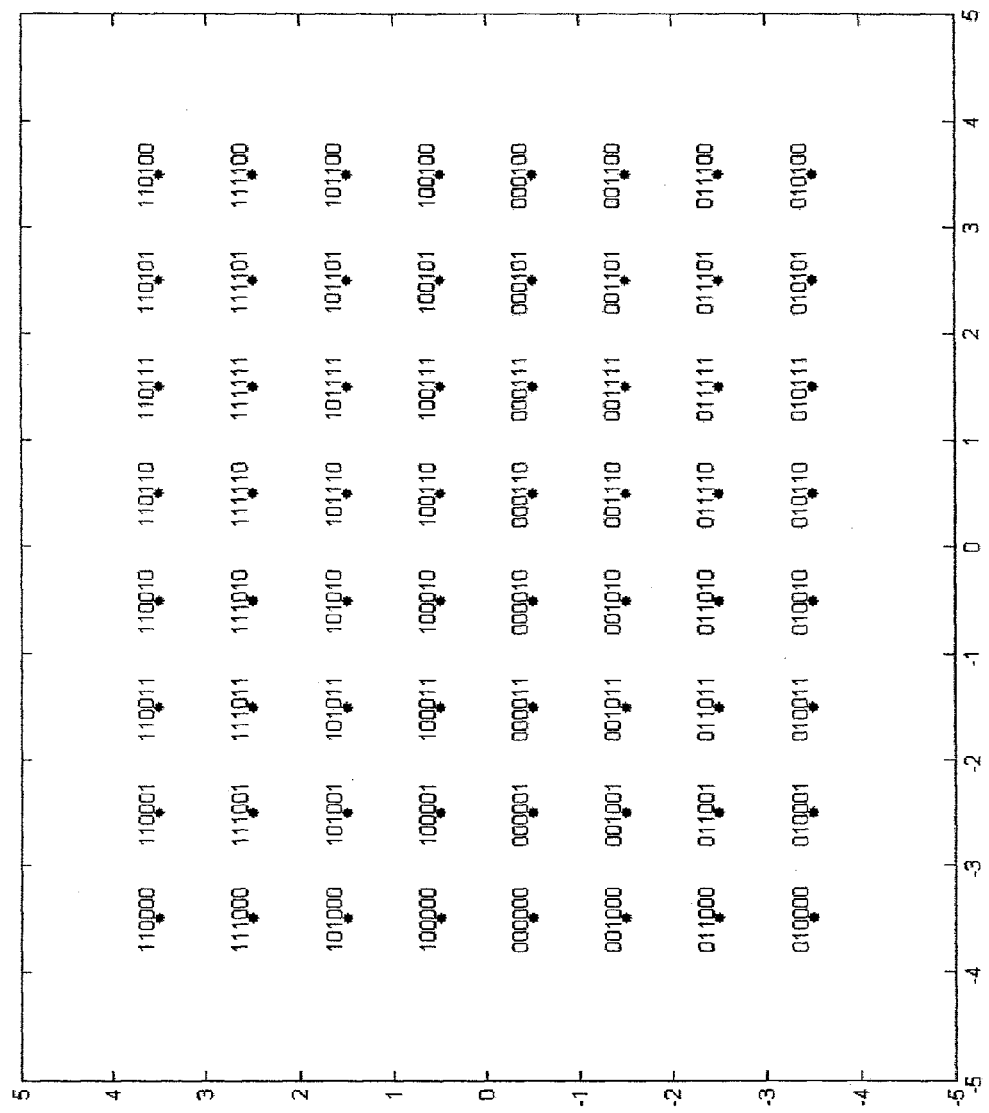
FIG. 12 is a schematic plot of a symbol set to available pulse states for the 64ATSK pulse encoding scheme as shown in FIG. 11.
Figure 13:
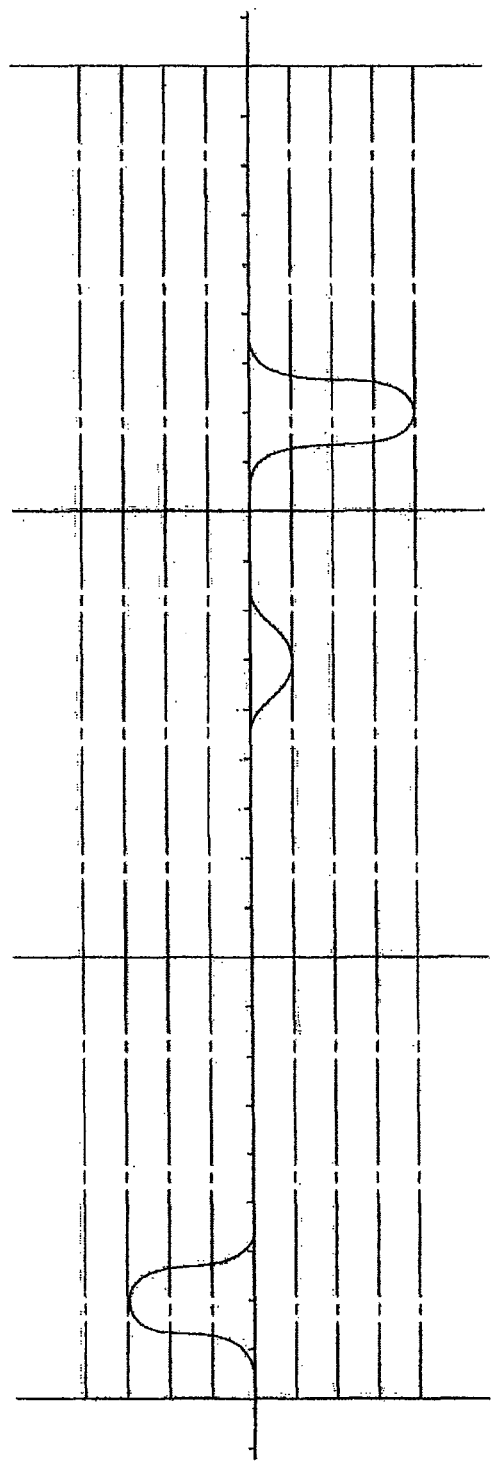
FIG. 13 is a schematic plot of three EM telemetry pulses produced by the 64ATSK pulse encoding scheme.

Referring now to FIGS. 11 and 12 and according to a third embodiment, the memory 58 contains encoder program code executable by downhole processor 56 to encode measurement data into a 6 bit, 64 state telemetry signal using a 16ATSK modulation technique. This modulation technique utilizes both amplitude shift keying using 8 distinct amplitude pulses (four positive, four negative) and timing shift keying using 8 distinct timing positions to create 64 unique states that map to a 64 symbol set comprising of symbols 000000 to 111111. FIG. 13 shows an example of the EM pulses that would be generated by the signal transmitter 13 using the 16ATSK modulation technique.

Figure 6:
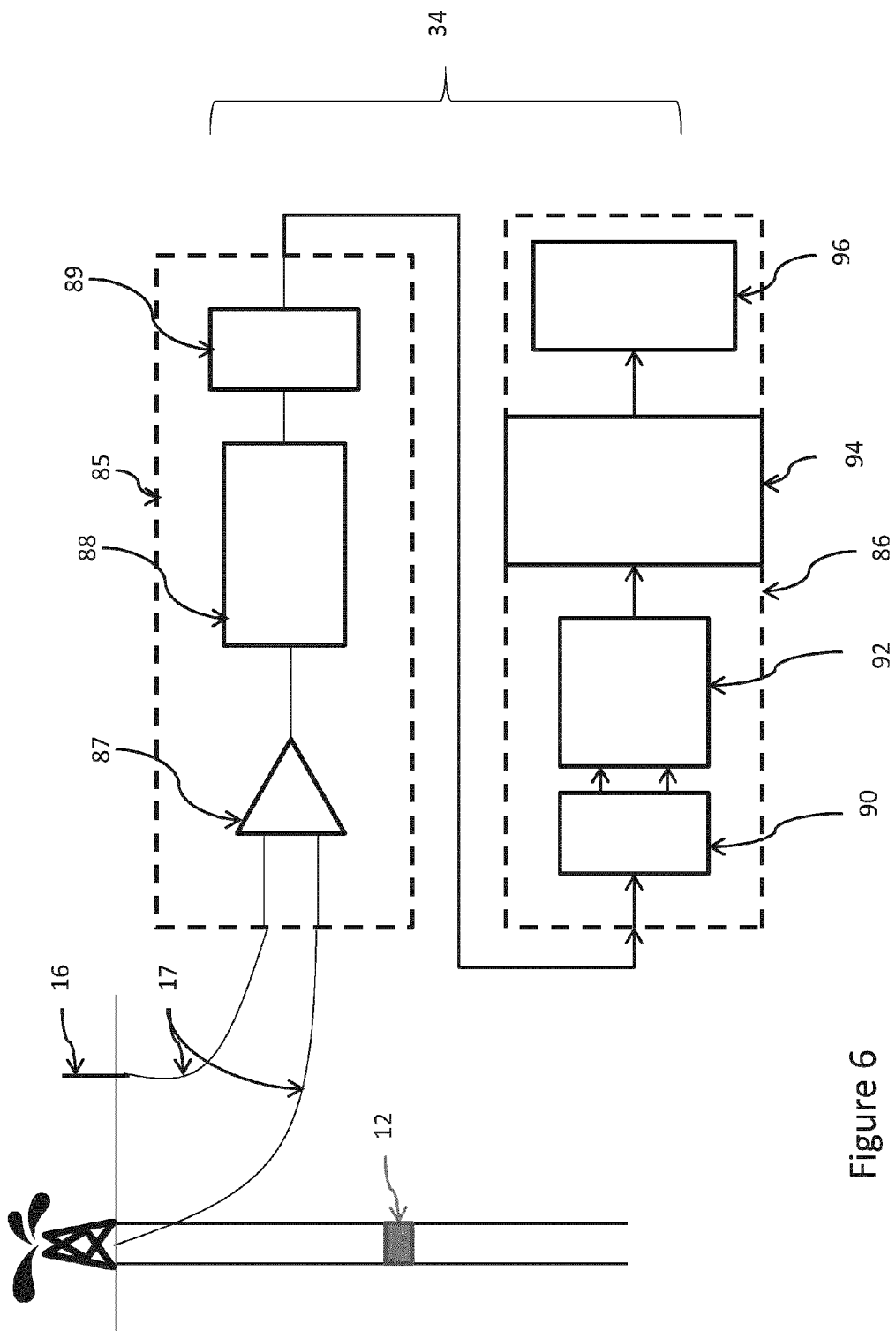
FIG. 6 is a schematic block diagram of surface components of the EM telemetry system according to one embodiment.

Referring now to FIG. 6, the surface receiving and processing equipment 34 receives and decodes the EM pulses to recover the telemetry data for use by the operator. As will be described in detail below, the surface receiving and processing equipment 34 will have stored thereon a demodulation technique corresponding to the selected modulation technique used by the EM telemetry tool 32 and the unique amplitude and/or timing position of each separate EM pulse used by the downhole EM telemetry tool 32 to encode the telemetry data, so that the EM pulses can be decoded.

More particularly, the surface receiving and processing equipment 34 comprises a surface receiver 85 and a decoder 86. The surface receiver 85 comprises a preamplifier 87 electrically coupled to the communication cables 17 to receive and amplify the EM telemetry transmission comprising the EM pulse signal, a band pass filter 88 communicative with the preamplifier 87 configured to filter out unwanted noise in the transmission, and an analog to digital converter (ADC) 89 communicative with the band pass filter 88 to convert the analog pulse signal into a digital signal. Such preamplifiers, band pass filters, and ND converters are well known in the art and thus are not described in detail here. For example, the preamplifier 87 can be an INA118 model from Texas Instruments, the ADC 89 can be a ADS1282 model from Texas Instruments, and the band pass filter 88 can be an optical band pass filter or an RLC circuit configured to pass frequencies between 0.1 Hz to 20 Hz.

The decoder 86 in one embodiment is a general purpose computer comprising a central processing unit ("surface processor") and a memory having decoder program code executable by the surface processor to perform various decoding functions, including digital signal filtering, digital signal processing, and digital signal-to-telemetry data decoding. Instead of using the surface processor to perform all of the decoding functions, separate hardware components can be used to perform one or more of the decoding functions; for example, an application-specific integrated circuit (ASIC) or field-programmable gate arrays (FPGA) can be used to perform the digital signal processing in a manner as is known in the art. The decoder 86 receives the carrier wave that has been digitized, filtered and amplified by the surface receiver 85, and performs each of the following decoding functions in the following sequence (these decoding functions are stored as program code on the memory of the computer and are executable by the surface processor):

Digital Filtering (step 90): The program code comprises low pass filters that are used to separate the EM pulse signal from background noise and DC bias generated in the receiver circuit.

Digital Signal Processing (step 92): Each EM pulse is in a bitstream form and is then subjected to a series of digital processing treatments in a digital signal processor as is known in the art, such as automatic gain control (AGC) to normalize the signal amplitude, synchronization to find the phase and timing differences between incoming signals and local signals, and demodulation and decoding to recover binary bits. Such digital processing treatments are known in the art of digital signal processing and thus are not described in detail here.

Demodulation (step 94): Then, each separate EM pulse is demodulated back into the corresponding measurement data bitstream using a demodulation technique that is configured to correspond specifically to the modulation technique used to encode the separate measurement data bitstreams into the EM pulses. Using the example shown in FIG. 9, the demodulation technique will determine the timing position and polarity of each separate pulse, and map the pulse back to the symbol it represents, thus recovering the original data bitstream. Such demodulation techniques are well known in the art and thus are not described in detail here.

Displaying (step 96): After demodulation, the measurement data is recovered. This data can be transmitted to the computer display 20 for viewing or manipulated by the operator into a useful form for display.

According to another embodiment and referring to FIGS. 14 to 23, a multi-channel EM telemetry system is provided which comprises a downhole EM telemetry tool 32 containing encoder program code that is executable by the downhole processor 56 to perform a method of encoding and transmitting a multi-channel EM telemetry signal that combines the EM pulse signal described above with an EM carrier wave signal, wherein each signal represents a separate channel of telemetry data. This combined telemetry signal is transmitted to surface in a single EM transmission. The EM telemetry system also comprises surface receiving and processing equipment 134 configured to receive the combined waveform and decode the waveform into the separate channels of telemetry data. It is expected that a high overall efficiency of data transmission can be achieved by sending multiple channels of telemetry data in a single EM transmission comprising the EM pulse and carrier wave signals.

Figure 14:
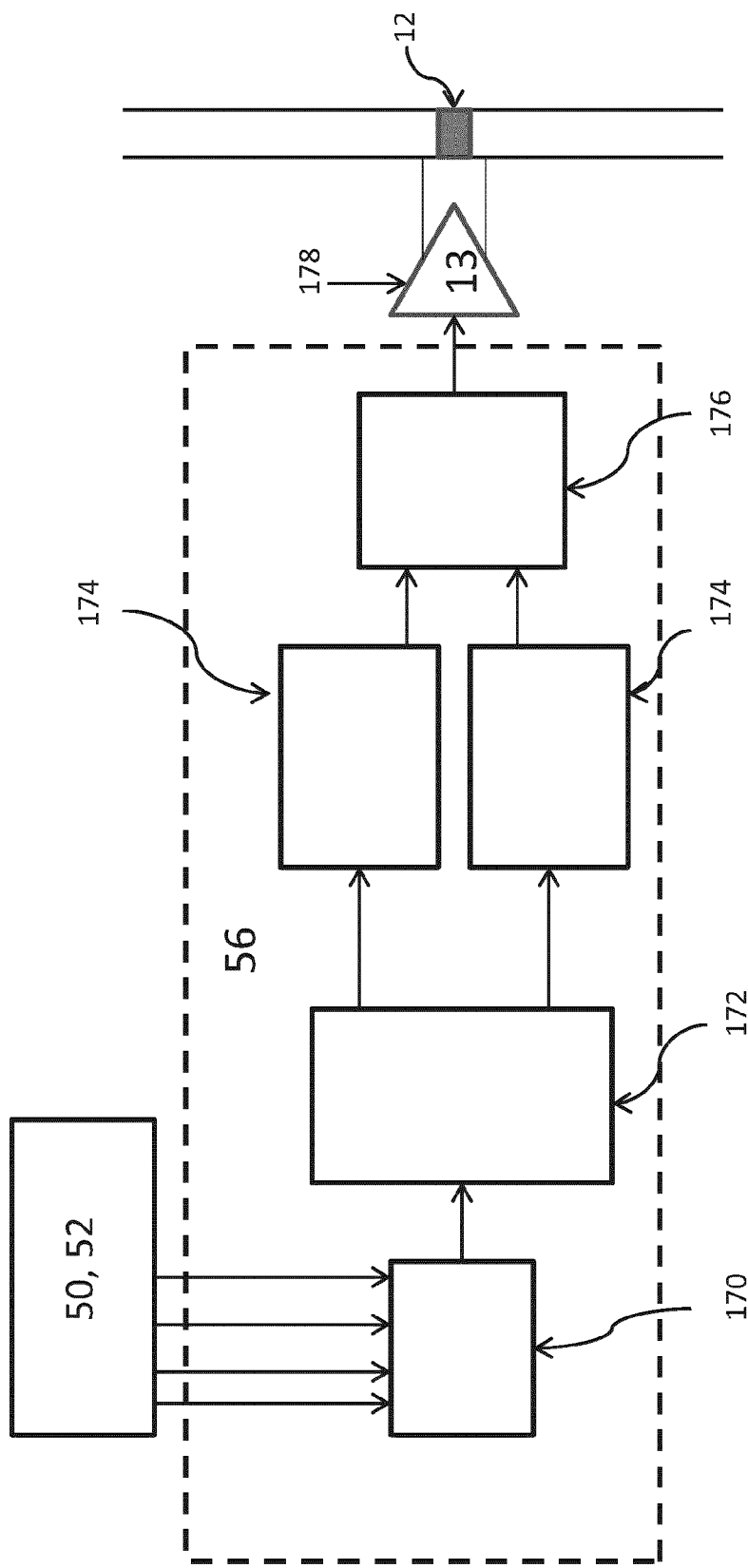
FIG. 14 is a flow chart of steps performed by the downhole EM telemetry tool of a multi-channel EM system in a method for transmitting a multi-channel EM telemetry signal that is a combination of an EM pulse signal and an EM telemetry carrier wave signal each representing a separate telemetry channel, according to an alternative embodiment.

Referring to FIG. 14, the downhole processor 56 reads raw measurement data from sensor modules 50, 52 and encodes this raw data into an encoded digital bitstream (step 170). Then the downhole processor 56 separates the encoded digital bitstream into two or more separate digital bitstreams, which in the embodiment shown in FIG. 14 comprises a first bitstream and a second bitstream (step 172). Then, the downhole processor 56 converts each digital bitstream into the EM pulse signal ("first telemetry channel") and the EM carrier wave signal ("second telemetry channel"); this conversion involves using a selected digital modulation technique to modulate the signals, wherein the frequencies of each signal being modulated is assigned a unique non-overlapping range of values, i.e. a range of values that is different than the range of values of the corresponding parameter(s) of the other waveforms (step 174). Then the downhole processor 56 combines each separate waveform into a combined waveform (step 176), and then sends a control signal to the signal transmitter 13 to transmit an EM telemetry signal comprising the combined EM signal across the gap sub 12 (step 178). Unlike the first embodiment, the combined EM signal will not be in form of pulse, but will be a waveform incorporating both EM pulses and EM carrier waves.

The conversion of each digital bitstream into a separate waveform can use a selected digital modulation technique to modulate the waveforms wherein the frequency of the EM pulses and the EM carrier waves being modulated are assigned a unique non-overlapping range of values.

Various digital modulation techniques known in the art can be used to encode each separate waveform, such as ASK, PSK, FSK, BPSK, QPSK or any combination of these or other individual modulation techniques as is known in the art. As the frequency range of the EM pulses and EM carrier waves are set at a unique value or non-overlapping range of values, the EM pulses and carrier waves encoded by one or more of these techniques can be superimposed to form one combined waveform for transmission to surface. As a result, one EM signal comprising the combined waveform can be transmitted to surface.

Figure 18:
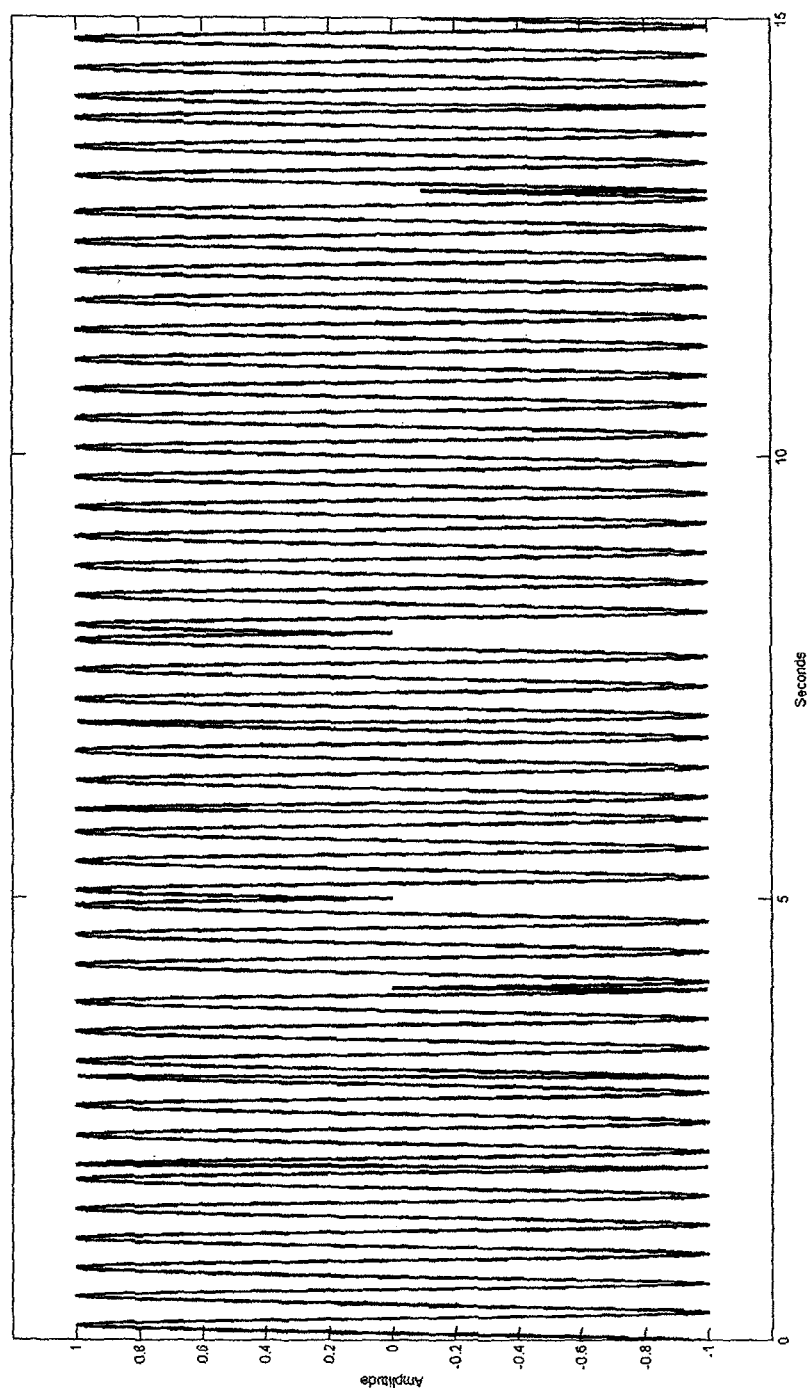
FIG. 18 is a graph of the EM carrier wave signal containing a QPSK encoded telemetry signal.
Figure 19:
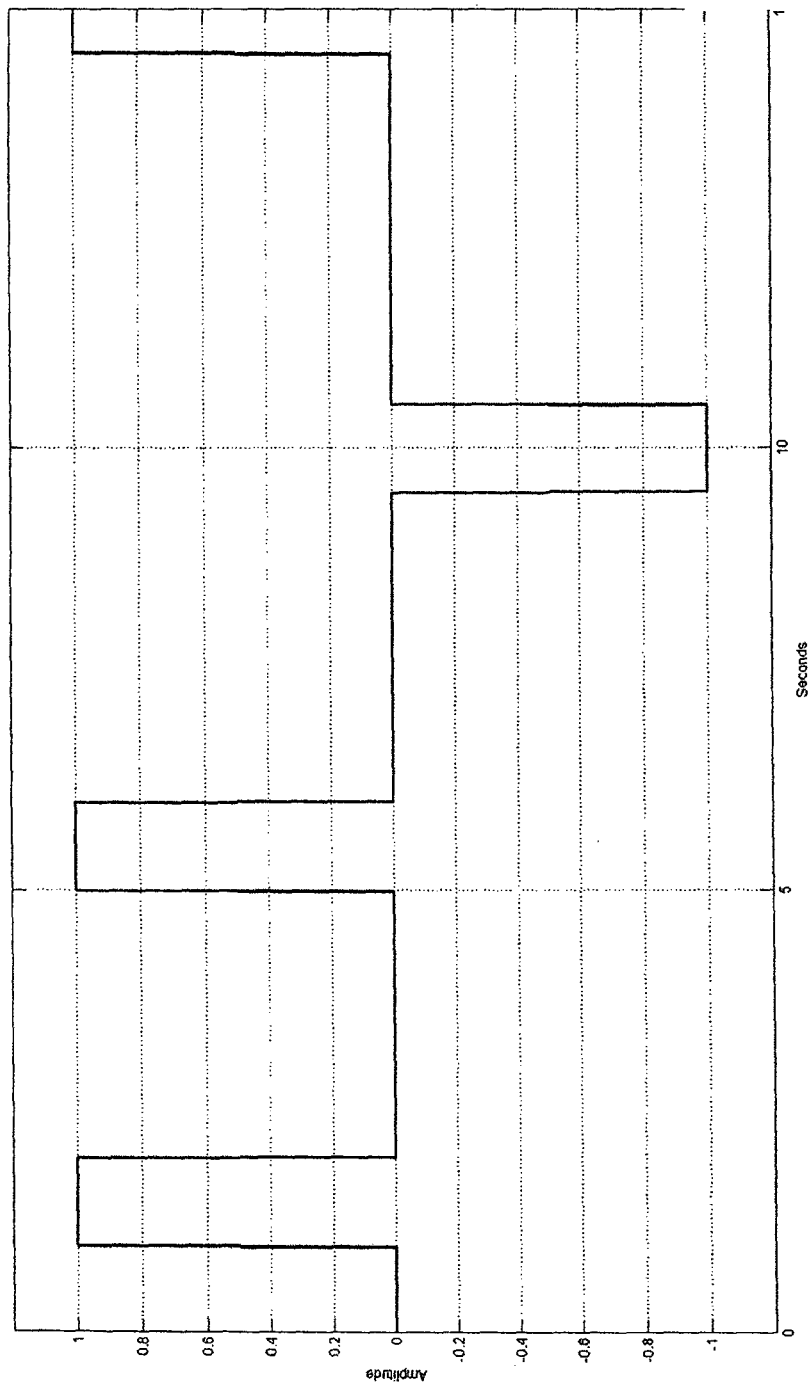
FIG. 19 is a graph of the EM pulse signal containing an 8ATSK telemetry signal.
Figure 20:
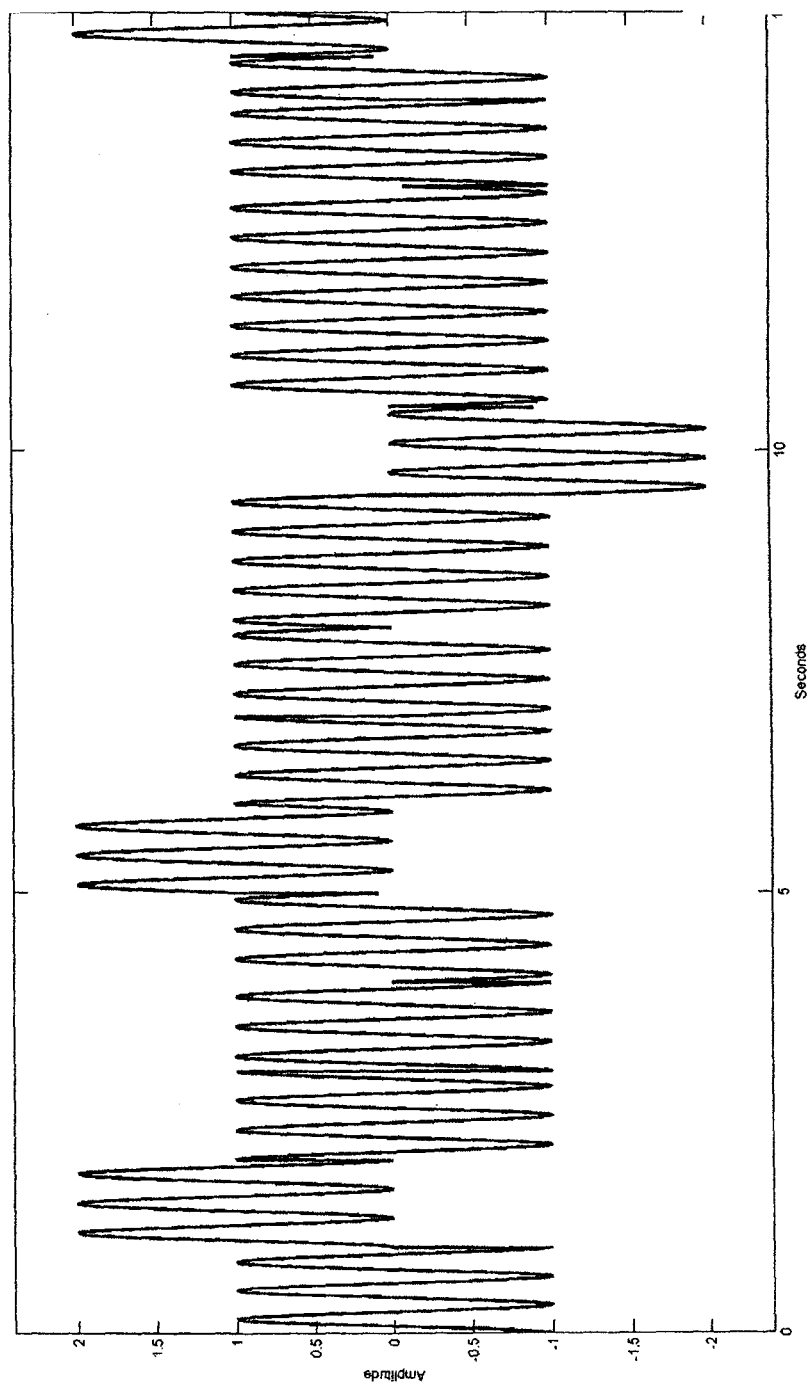
FIG. 20 is a graph of a combined EM telemetry signal that is a combination of the EM carrier wave signal shown in FIG. 18 and the EM pulse signal shown in FIG. 19, as transmitted by the downhole telemetry tool.

In one example and referring to FIGS. 18 to 20, the EM carrier waves can be modulated using QPSK at a frequency of 3 Hz to produce the EM carrier wave signal (shown in FIG. 18), and the EM pulses can be modulated using 8ATSK at a one second impulse to produce the EM pulse signal (shown in FIG. 19). Both signals have an amplitude normalized to 1. These signals are then combined into the combined waveform as shown in FIG. 20.

Figure 15:
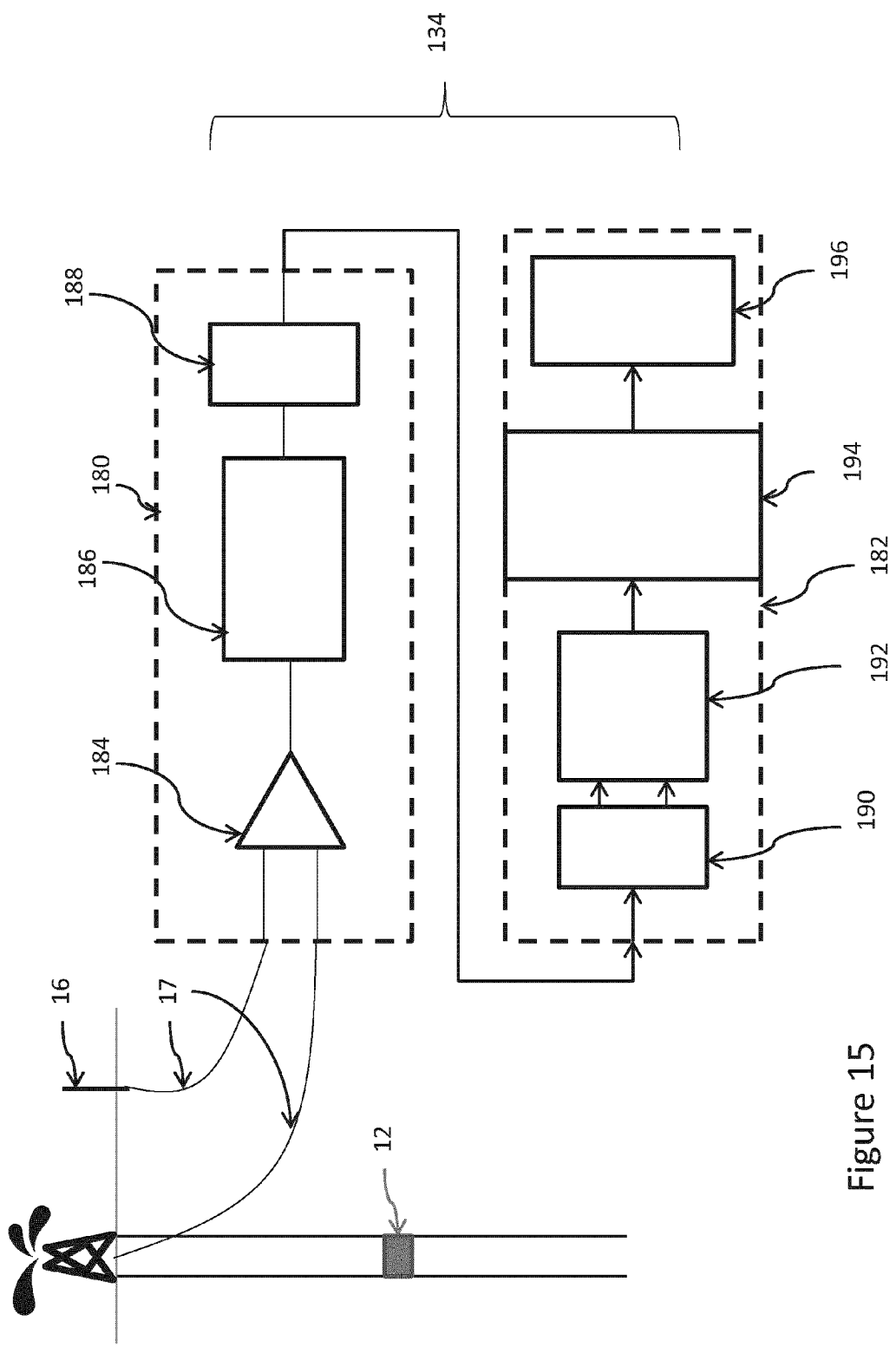
FIG. 15 is a schematic block diagram of surface equipment of the multi-channel EM telemetry system according to one embodiment.
Figure 21:
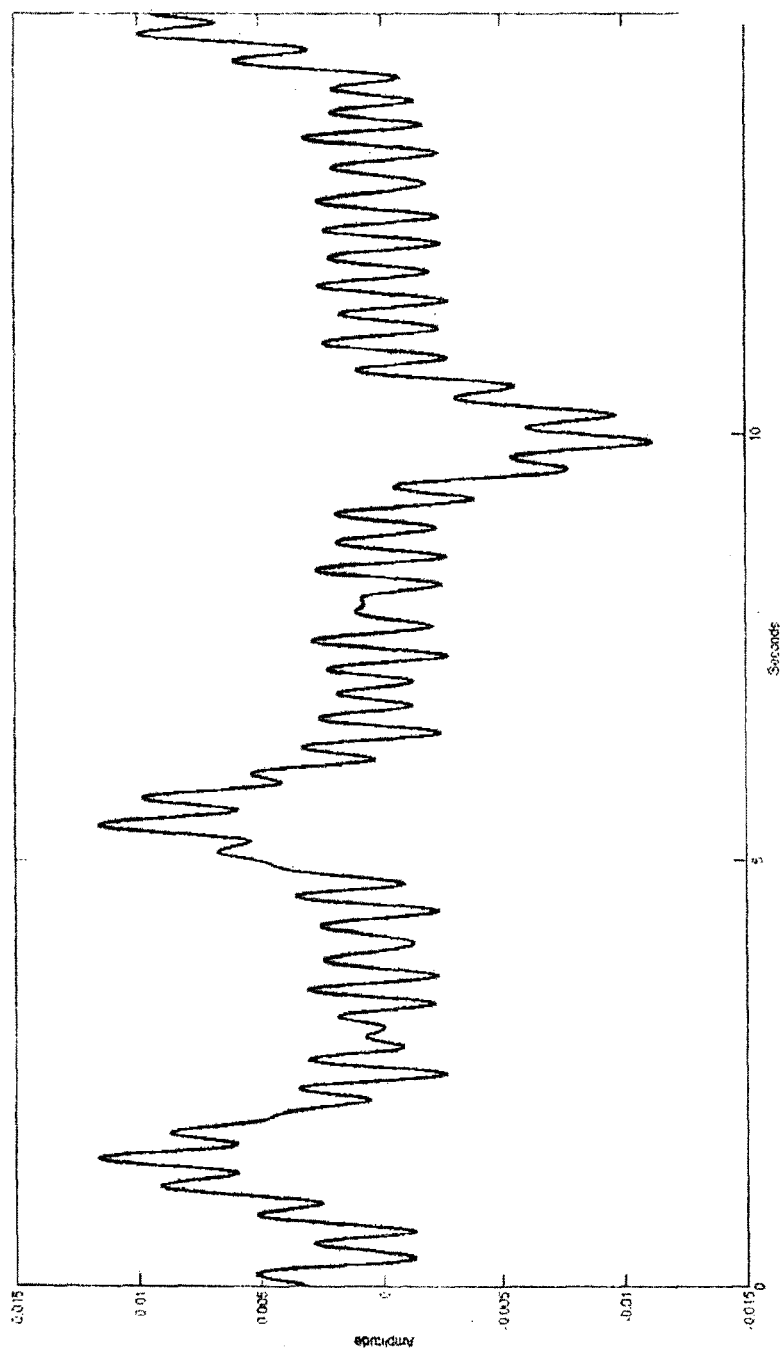
FIG. 21 is a graph of the combined EM telemetry signal of FIG. 20 as received by the surface equipment.
Figure 22:
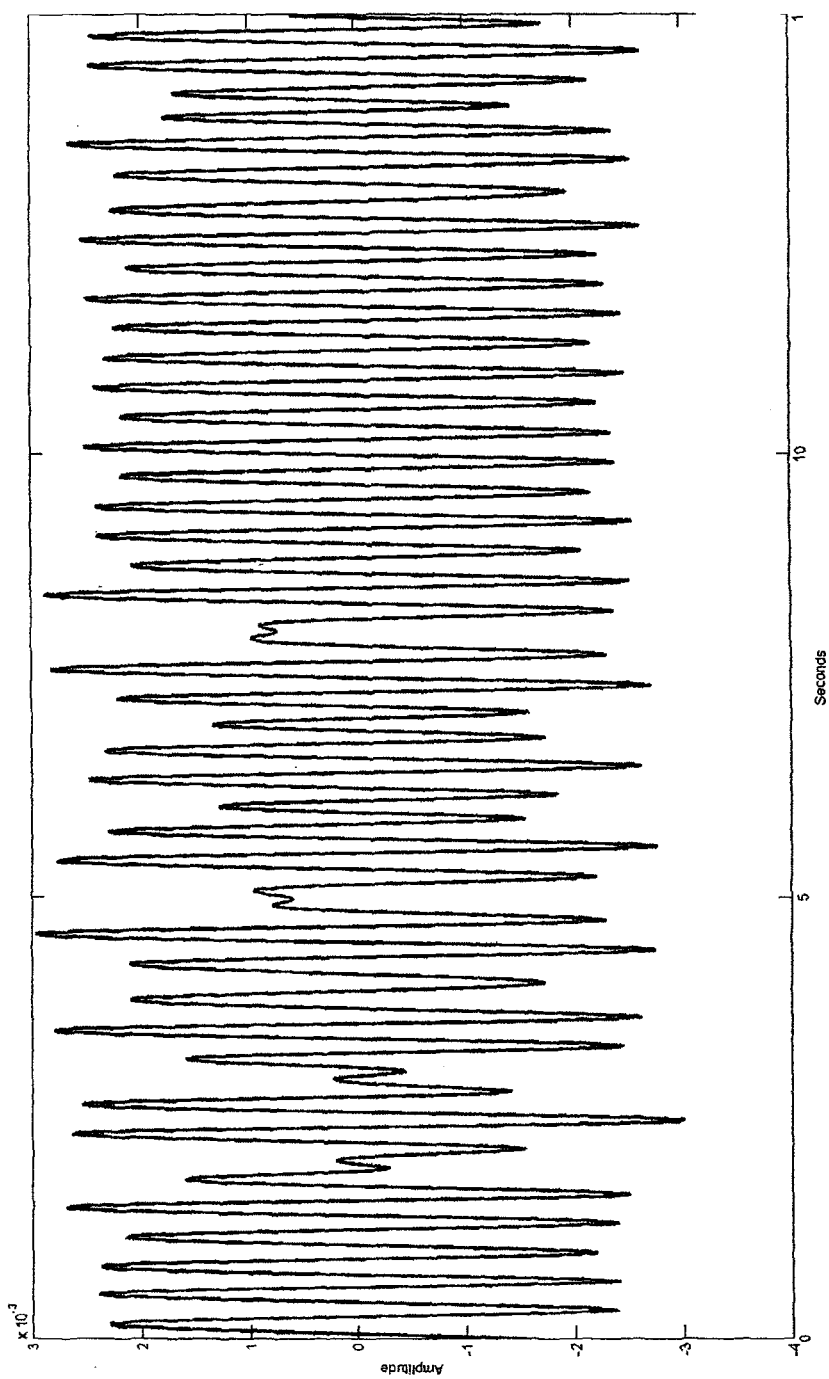
FIG. 22 is the QPSK encoded telemetry signal separated from the received EM telemetry signal shown in FIG. 21 by a decoder of the surface equipment.
Figure 23:
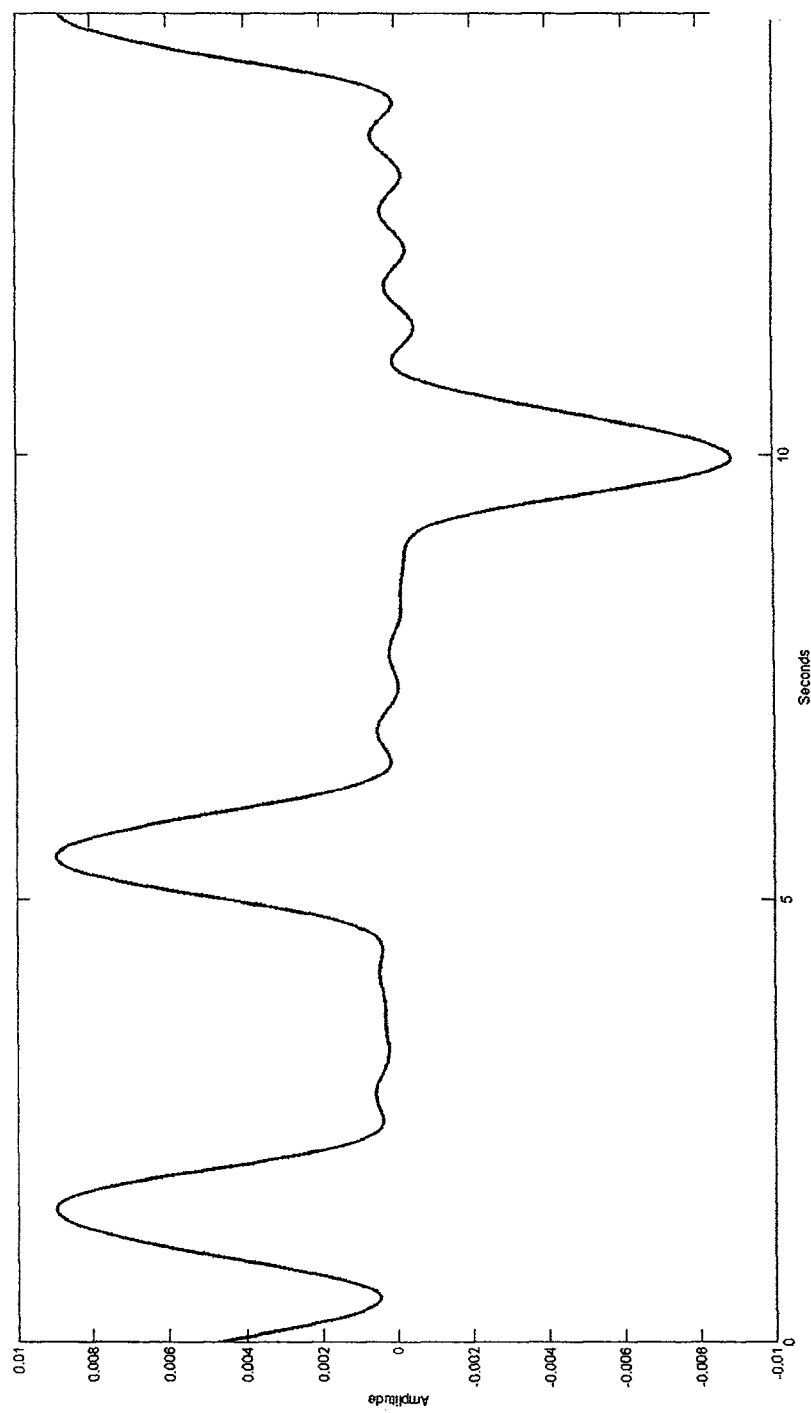
FIG. 23 is the 8ATSK encoded telemetry signal separated from the received EM telemetry signal shown in FIG. 21 by the decoder.

Referring now to FIG. 15, the surface receiving and processing equipment 134 receives the combined waveform and decodes the combined waveform to recover each separate telemetry channel; the combined waveform sent by the EM telemetry tool 32 will have attenuated as the waveform travels through the Earth and FIG. 21 shows the combined waveform as received by the surface receiving and processing equipment 134. The telemetry channels can then be converted back into the measurement data for use by the operator. As will be described in detail below, the surface receiving and processing equipment 134 will have stored thereon a demodulation technique corresponding to the selected modulation technique used by the EM telemetry tool 32 and the unique frequency range of each separate telemetry signal of the combined waveform used by the downhole EM telemetry tool 32 to encode the EM pulses and carrier waves, so that the combined waveform can be decoded to obtain the telemetry data.

The surface receiving and processing equipment 134 comprises a surface receiver 180 and a decoder 182. The surface receiver 180 comprises a preamplifier 184 electrically coupled to the communication cables 17 to receive and amplify the EM telemetry transmission comprising the combined waveform, a band pass filter 186 communicative with the preamplifier 184 configured to filter out unwanted noise in the transmission, and an analog to digital converter (ADC) 188 communicative with the band pass filter 186 to convert the analog combined waveform into a digital signal. Such preamplifiers, band pass filters, and ND converters are well known in the art and thus are not described in detail here. For example, the preamplifier 184 can be an INA118 model from Texas Instruments, the ADC 188 can be a ADS1282 model from Texas Instruments, and the band pass filter 186 can be an optical band pass filter or an RLC circuit configured to pass frequencies between 0.1 Hz to 20 Hz.

The decoder 182 in one embodiment is a general purpose computer comprising a central processing unit ("surface processor") and a memory having decoder program code executable by the surface processor to perform various decoding functions, including digital signal filtering and separation, digital signal processing, digital signal recombination, and digital signal-to-telemetry data decoding. Instead of using the surface processor to perform all of the decoding functions, separate hardware components can be used to perform one or more of the decoding functions; for example, an application-specific integrated circuit (ASIC) or field-programmable gate arrays (FPGA) can be used to perform the digital signal processing in a manner as is known in the art.

Figure 17:
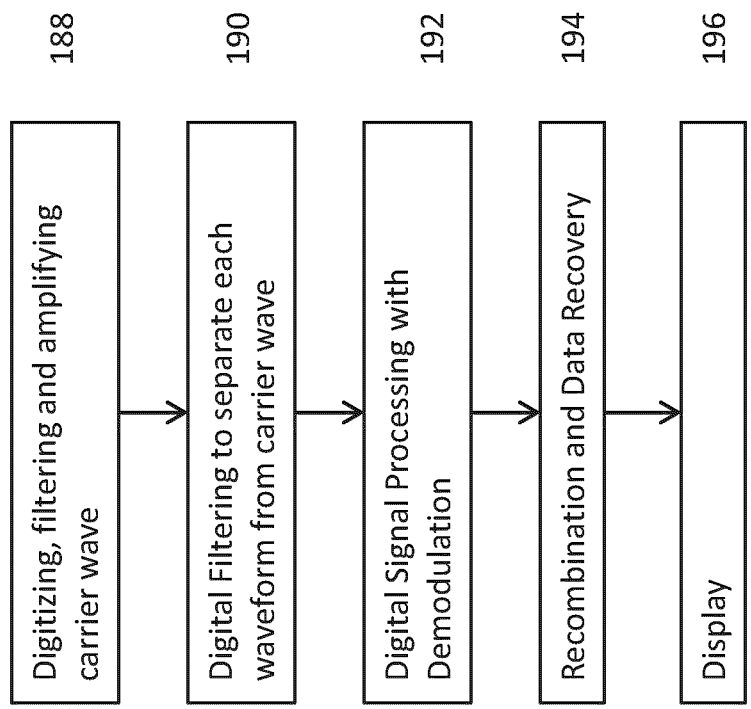
FIG. 17 is a flowchart of steps performed by the surface equipment of the multi-channel EM telemetry system to receive and decode the multi-channel EM telemetry signal transmitted by the downhole EM telemetry tool.

Referring to FIG. 17, the decoder 182 receives the carrier wave that has been digitized, filtered and amplified by the surface receiver 180 (step 188), and performs each of the following decoding functions in the following sequence (these decoding functions are stored as program code on the memory of the computer and are executable by the surface processor):

Digital Filtering (step 190): When each of the EM pulses and carrier waves is encoded by a modulation technique at a unique frequency, the program code comprises a series of band pass filters that are used to separate different frequency bands from the combined waveform. More particularly, each band pass filter is configured to pass one of the unique frequencies corresponding to one of the EM pulses and carrier waves and severely attenuate all other frequencies, such that the EM pulses or carrier waves corresponding to this unique frequency can be separated from the combined waveform.

Digital Signal Processing (Step 192): Each separated stream of pulses or carrier waves is in a bitstream form and is then subjected to a series of digital processing treatments known in the art, such as automatic gain control (AGC) to normalize the signal amplitude, synchronization to find the phase and timing differences between incoming signals and local oscillation signals, and demodulation and decoding to recover binary bits. Such digital processing treatments are known in the art of digital signal processing and thus are not described in detail here. Then, each stream of EM pulses and carrier waves is demodulated back into the corresponding measurement data bitstream using a demodulation technique that is configured to correspond specifically to the modulation technique used to encode the separate measurement data bitstreams into the separate EM pulses and carrier waves. Using the example shown in FIGS. 18 to 20 but now referring to FIGS. 21 to 23, the demodulation technique will determine the frequency of each separate stream of EM pulses (FIG. 23) and EM carrier waves (FIG. 22), and map the pulses or carrier waves back to the symbols they represent, thus recovering the original data bitstream. Such demodulation techniques are well known in the art and thus are not described in detail here.

Digital Signal Recombination (Step 194): After demodulation, the separate raw measurement data streams are recombined back into the single raw measurement data stream that existed at step 170. Once the single raw measurement data bitstream has been recombined, the data can be decoded and viewed on the computer display 20 or manipulated by the operator into a useful form for display (step 196).

Instead of recombining all of the separate measurement data streams into the single measurement data stream, a subset of separate data streams can be combined for display to the operator, or each individual data stream can be processed and displayed for the operator.

Figure 16:
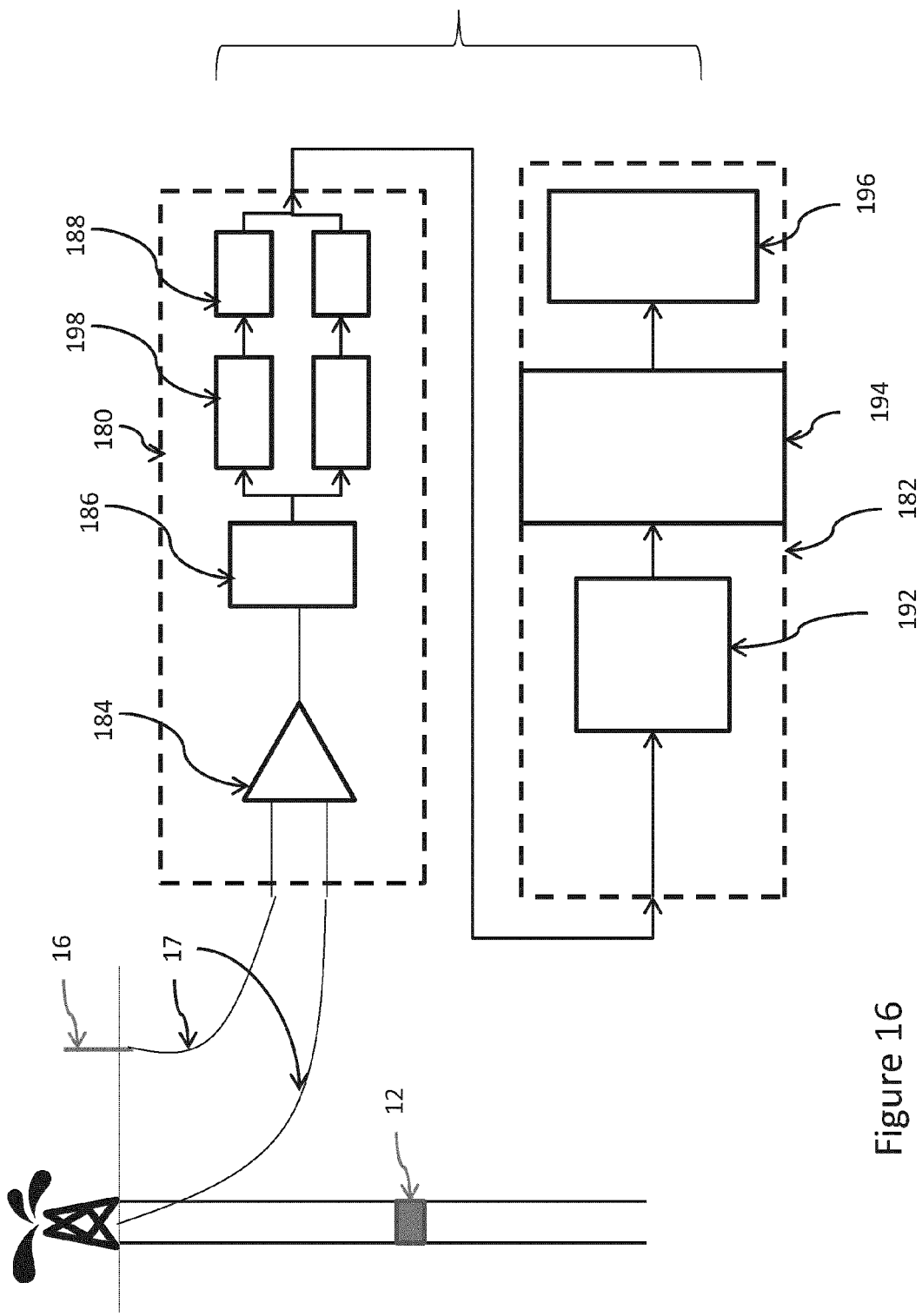
FIG. 16 is a schematic block diagram of surface equipment of the multi-channel EM telemetry system according to another embodiment.

According to an alternative embodiment and referring to FIG. 16, the surface receiver 80 and decoder 82 have been modified such that all signal filtering is performed by a modified surface receiver 180 on the EM pulses and carrier waves, prior to digitization. More particularly, the surface receiver 180 employs narrow band hardware filters 198 of different frequency ranges to separate out each separate analog pulse or waveform from the analog combined waveform. Multiple ADCs are then used to convert an EM pulse stream and an EM carrier wave stream into digital signals. In contrast, the surface receiver 180 and decoder 182 according to FIG. 15 perform analog signal filtering of the analog combined waveform, as well as digital signal filtering of the digitized combined waveform. Here, only one ADC is used to cover the combined waveform, and digital band-pass filtering is performed by software rather than by hardware.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. A method for transmitting electromagnetic (EM) telemetry data from a downhole location to surface, comprising:
(a) encoding measurement data, comprising a set of bit sequences, into an EM telemetry signal using one or more modulation schemes wherein at least one modulation scheme comprises mapping each bit sequence in the set of bit sequences to a pulse state selected from a positive polarity EM pulse and a negative polarity EM pulse and to a selected amplitude selected from a range of amplitudes of the positive and negative polarity EM pulses, wherein the one or more modulation schemes include one or more of amplitude shift keying (ASK) and amplitude and timing shift keying (ATSK) comprising mapping each bit sequence in the set of bit sequences to a pulse state having at least one of a selected amplitude, a selected polarity, and a selected timing position; and
(b) generating EM pulses corresponding to the EM telemetry signal, comprising applying a voltage across a positive pathway of an H-bridge circuit electrically coupled to positive and negative ends of a gap sub to generate a positive polarity EM pulse, applying a voltage across a negative pathway of the H-bridge circuit to generate a negative polarity EM pulse, varying the voltage applied to the H-bridge circuit to vary the amplitude for the ATSK modulation scheme, and varying the timing of applying the voltage to the H-bridge circuit to vary the timing position for the ATSK modulation scheme.

2. A method as claimed in claim 1 wherein the step of generating the EM pulses comprises applying a voltage across a positive pathway of an H-bridge circuit electrically coupled to positive and negative ends of a gap sub to generate the positive polarity EM pulse, and applying a voltage across a negative pathway of the H-bridge circuit to generate the negative polarity EM pulse.

3. A method as claimed in claim 1 wherein the step of generating the EM pulses comprises applying a voltage across a positive pathway of an H-bridge circuit electrically coupled to positive and negative ends of a gap sub to generate the positive polarity EM pulse, applying a voltage across a negative pathway of the H-bridge circuit to generate the negative polarity EM pulse, and varying the voltage applied to the H-bridge circuit to vary the amplitude for the modulation scheme.

4. A method as claimed in claim 1 further comprising selecting a pulse frequency range and the step of generating positive and negative polarity EM pulses comprises generating EM pulses having a pulse width corresponding to the selected pulse frequency range.

5. A method as claimed in claim 4 wherein the measurement data is of a formation through which the EM pulse will travel, and the step of selecting the pulse frequency range comprises determining an attenuation of the formation from the measurement data and selecting a frequency range suitable for the determined attenuation.

6. An apparatus for transmitting EM telemetry data from a downhole location to surface, comprising:
(a) a gap sub;
(b) an EM signal transmitter configured to generate positive and negative polarity EM pulses with varying amplitudes corresponding to a telemetry signal, and comprising an H-bridge circuit electrically coupled to positive and negative ends of the gap sub such that applying a voltage across a positive pathway of the H-bridge circuit generates a positive polarity EM pulse, applying a voltage across a negative pathway of the H-bridge circuit generates a negative polarity EM pulse, varying the voltage applied to the H-bridge circuit varies the amplitude for an ATSK modulation scheme, and varying the timing of applying the voltage to the H-bridge circuit varies the timing position for an ATSK modulation scheme; and
(c) an electronics subassembly communicative with the EM signal transmitter and comprising a processor and a memory having encoded thereon program code executable by the processor to perform a method comprising:
encoding measurement data, comprising a set of bit sequences, into an EM telemetry signal using one or more modulation schemes wherein at least one modulation scheme comprises mapping each bit sequence in the set of bit sequences to a pulse state selected from a positive polarity EM pulse and a negative polarity EM pulse and to a selected amplitude selected from a range of amplitudes of the positive and negative polarity EM pulses, wherein the one or more modulation schemes include one or more of amplitude shift keying (ASK) and amplitude and timing shift keying (ATSK) comprising mapping each bit sequence in the set of bit sequences to a pulse state having at least one of a selected amplitude, a selected polarity, and a selected timing position; and
sending a control signal to the EM signal transmitter to generate EM pulses corresponding to the EM telemetry signal.

7. An apparatus as claimed in claim 6 wherein the EM signal transmitter further comprises a voltage regulator electrically coupled to the H-bridge circuit, a power source coupled to the voltage regulator, and a signal generator communicative with the voltage regulator, the H-bridge circuit, and the electronics subassembly, the signal generator configured to receive the control signal from the processor and to send a polarity control signal to the H-bridge circuit and a voltage output and timing control signal to the voltage regulator.

8. An apparatus as claimed in claimed in claim 7 wherein the voltage regulator is a variable output voltage regulator capable of outputting voltage levels corresponding to the selected amplitudes in the modulation scheme.

9. An apparatus as claimed in claim 7 wherein the memory further comprises program code that when executed by the processor performs a step of selecting a pulse frequency and the control signal to the EM signal transmitter comprises instructions for generating EM pulses having a pulse width corresponding to the selected pulse frequency.

10. An apparatus as claimed in claim 9 wherein the electronics subassembly further comprises sensors for measuring a formation through which the EM pulses will travel, and wherein the step of selecting a pulse frequency comprises determining an attenuation of the formation from the measurement data and selecting a pulse frequency suitable for the determined attenuation.

11. A method as claimed in claim 1, wherein a bit sequence comprises one or more bits.

12. An apparatus as claimed in claim 6, wherein a bit sequence comprises one or more bits.

* * * * *